(12) United States Patent
Sekiguchi et al.

(10) Patent No.: US 9,645,438 B2
(45) Date of Patent: May 9, 2017

(54) LIQUID CRYSTAL DISPLAY DEVICE

(71) Applicant: FUJIFILM Corporation, Tokyo (JP)

(72) Inventors: Megumi Sekiguchi, Minami-ashigara (JP); Hiromichi Furukawa, Minami-ashigara (JP); Naoyoshi Yamada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 16 days.

(21) Appl. No.: 14/924,879

(22) Filed: Oct. 28, 2015

(65) Prior Publication Data

US 2016/0048057 A1 Feb. 18, 2016

Related U.S. Application Data

(63) Continuation of application No. PCT/JP2014/061561, filed on Apr. 24, 2014.

(30) Foreign Application Priority Data

May 1, 2013 (JP) ................................ 2013-096175

(51) Int. Cl.
*G02F 1/1335* (2006.01)
*G02B 5/30* (2006.01)
*G02F 1/1333* (2006.01)

(52) U.S. Cl.
CPC ....... *G02F 1/133528* (2013.01); *G02B 5/305* (2013.01); *G02F 1/133602* (2013.01);
(Continued)

(58) Field of Classification Search
CPC .................. G02F 1/133528; G02F 1/13363
See application file for complete search history.

(56) References Cited

FOREIGN PATENT DOCUMENTS

JP 2012-137723 A 7/2012

OTHER PUBLICATIONS

International Search Report for PCT/JP2014/061561 dated Jul. 29, 2014 [PCT/ISA/210].

(Continued)

*Primary Examiner* — Phu Vu
(74) *Attorney, Agent, or Firm* — Sughrue Mion, PLLC

(57) ABSTRACT

Provided is a liquid crystal display device including a liquid crystal cell having a liquid crystal layer between two glass substrates, a front-side polarizing plate provided on a front side of the liquid crystal cell, a rear polarizer provided on a rear side of the liquid crystal cell, and a backlight provided on a rear side of the rear polarizer, in which the front-side polarizing plate has a first protective film, a polarizer, and a second protective film in this order from a surface side opposite to the liquid crystal cell, the first protective film in the front-side polarizing plate is a film including a polyester resin or a polycarbonate resin as a main component, an Re of the first protective film is 3000 nm or higher, an equilibrium moisture content of the second protective film at 25° C. and a relative humidity of 60% is in a range of 1% to 3%, and in the second protective film, a contractile force in a direction orthogonal to an absorption axis of the polarizer is 1.3 times or higher a contractile force in a direction parallel to the absorption axis of the polarizer which is capable of suppressing luminance unevenness at the four corners of the panel when a backlight is turned on after the liquid crystal display device has been stored in a hot and humid environment.

7 Claims, 1 Drawing Sheet

(52) U.S. Cl.
CPC ............ *G02F 2001/133302* (2013.01); *G02F 2001/133562* (2013.01); *G02F 2001/133567* (2013.01); *G02F 2201/50* (2013.01); *G02F 2201/54* (2013.01); *G02F 2202/28* (2013.01)

(56) References Cited

OTHER PUBLICATIONS

Written Opinion for PCT/JP2014/061561 dated Jul. 29, 2014 [PCT/ISA/237].
International Preliminary Report on Patentability issued from the International Bureau in counterpart International Application No. PCT/JP2014/061561, mailed on Nov. 12, 2015.

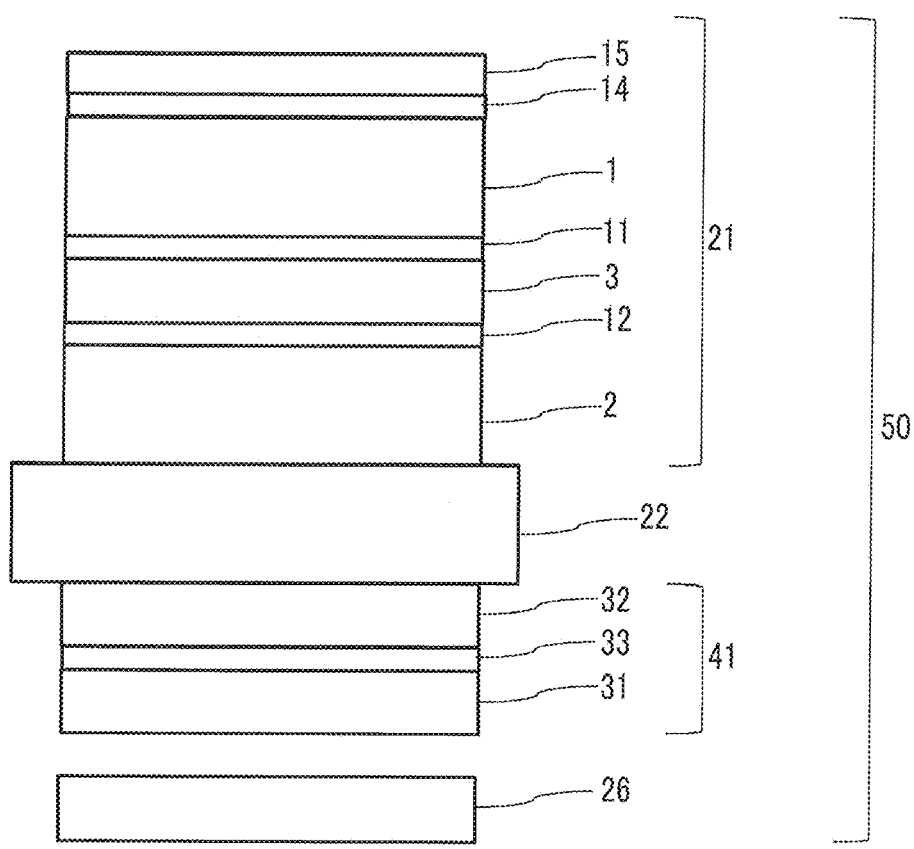

LIQUID CRYSTAL DISPLAY DEVICE

CROSS-REFERENCE TO RELATED APPLICATIONS

This application is a Continuation of PCT International Application No. PCT/JP2014/061561, filed on Apr. 24, 2014, which claims priority under 35 U.S.C. Section 119(a) to Japanese Patent Application No. 2013-096175 filed on May 1, 2013. Each of the above applications is hereby expressly incorporated by reference, in its entirety, into the present application.

BACKGROUND OF THE INVENTION

1. Field of the Invention

The present invention relates to a liquid crystal display device.

2. Description of the Related Art

A liquid crystal display device has a basic configuration of having polarizing plates on both sides of a liquid crystal cell.

A polarizing plate in a liquid crystal display device has a configuration in which transparent protective films are attached to both front and rear sides of a polarizer made of a polyvinyl alcohol film or the like in which, generally, iodine or a dye is adsorbed and aligned. As the polarizing plate protective film, a cellulose acylate-based polarizing plate protective film represented by cellulose acetate has been widely used due to its favorable transparency and its adhesiveness to a polyvinyl alcohol that is used for a polarizer.

Meanwhile, in recent years, a polyester resin such as PET or a (meth)acrylic resin has become more frequently used as the polarizing plate protective film. This is because an adhesion technique has improved, and it has become possible to ensure adhesiveness to a polyvinyl alcohol.

In recent years, in response to an increase in use of a liquid crystal display device, there has been a demand for a liquid crystal display device with a large size and a high-quality texture. In order to reduce the weight of a large-sized liquid crystal display device, the thicknesses of a variety of members have been decreased and, among them, the thickness of a glass substrate has been decreased from 0.7 mm, the thickness in the related art, to 0.5 mm or lower. Furthermore, in recent years, studies have been underway regarding a glass substrate with a thickness of 0.3 mm.

In JP2012-137723A, studies are conducted regarding color unevenness or color fading occurring when a polarizing plate is placed in a high-temperature environment, and it is found that, when the amount of moisture absorbed is adjusted to be in a certain range when a humidification treatment is carried out on a front-side polarizing plate located on the viewer side of a liquid crystal cell and a rear polarizer located on a side opposite to the front-side polarizing plate respectively, it is possible to control the warping of a liquid crystal panel which has been located in a hot and humid environment when a backlight is turned on, and such an adjustment is effective in improving display unevenness. In addition, it is also found that, when the moisture evaporation rates are respectively adjusted to be in a certain range in the front-side polarizing plate located on the viewer side of the liquid crystal cell and the rear polarizer located on the side opposite to the front-side polarizing plate, it is possible to control the warping of the liquid crystal panel which has been located in a hot and humid environment when the backlight is turned on, and such an adjustment is effective in improving display unevenness.

SUMMARY OF THE INVENTION

However, in JP2012-137723A, while there has been a proposal regarding the improvement of the warping or unevenness of a panel which has been located in a high-temperature environment, no attention has been paid to a problem of the warping of a panel (a form of having polarizing plates on both sides of a liquid crystal cell including a glass substrate with a small thickness, for example, 0.5 mm or smaller) in a liquid crystal display device in which the liquid crystal cell is used or the occurrence of uneven display (uneven luminance distribution or uneven luminance) caused by the warping.

An object of the present invention is to solve is to provide a liquid crystal display device capable of suppressing uneven luminance at four corners of a panel, which is an emerging problem, in a large-sized (for example, 32 inches or larger) liquid crystal display device in which the thickness of a glass substrate configuring a liquid crystal cell is small (for example, the thickness of the glass substrate is small, for example, 0.5 mm or smaller) occurring when a backlight is turned on after the liquid crystal display device has been stored in a hot and humid environment.

A panel in a liquid crystal display device has a liquid crystal cell and two polarizing plates on both surfaces of the liquid crystal cell. When the liquid crystal display device is placed in a highly humid environment (for example, at 50° C. and a relative humidity of 80% for ten days), both polarizing plates on the front side and on the rear side include water and swell. After that, when the liquid crystal display device is left to stand and is dried, the swollen polarizing plates including water dry and contract. Since the polarizing plate on the rear side is placed in a more airtight environment than the polarizing plate on the front side, while the polarizing plate on the front side dries more rapidly, and thus a greater contractile force is generated, the polarizing plate on the rear side dries slowly, and a small contractile force is generated. The present inventors found that the difference between the contractile force in the polarizing plate on the front side and the contractile force in the polarizing plate on the rear side causes the panel to warp, and consequently, four corners of the panel come into contact with a bezel, and thus luminance unevenness (light leak at the four corners of the panel) is caused.

Therefore, the present inventors conducted intensive studies regarding the suppression of the occurrence of luminance unevenness at the four corners of the panel by decreasing the difference between the contractile force in the polarizing plate on the front side and the contractile force in the polarizing plate on the rear side and, consequently, found that, when the contractile force ratio between polarizing plate protective films on a liquid crystal cell side is set to a predetermined value, the contractile force in the polarizing plate on the front side decreases and vanishes, it is possible to decrease the difference between the contractile force in the polarizing plate on the front side and the contractile force in the polarizing plate on the rear side, and it is possible to suppress the occurrence of luminance unevenness at the four corners of the panel when a backlight is turned on after the liquid crystal display device has been placed in a hot and humid environment by suppressing the warping of the panel.

The present invention has been made on the basis of the above-described findings.

That is, the above-described problem is solved by the present invention having the following configuration.

[1] A liquid crystal display device including:
a liquid crystal cell having a liquid crystal layer between two glass substrates;
a front-side polarizing plate provided on a front side of the liquid crystal cell;
a rear polarizer provided on a rear side of the liquid crystal cell; and
a backlight provided on a rear side of the rear polarizer,
in which the front-side polarizing plate has a first protective film, a polarizer, and a second protective film in this order from a surface side opposite to the liquid crystal cell,
the first protective film in the front-side polarizing plate is a film including a polyester resin or a polycarbonate resin as a main component,
a retardation Re in an in-plane direction of the first protective film in the front-side polarizing plate is 3000 nm or higher,
an equilibrium moisture content of the second protective film in the front-side polarizing plate at 25° C. and a relative humidity of 60% is in a range of 1% to 3%, and
in the second protective film in the front-side polarizing plate, a contractile force in a direction orthogonal to an absorption axis of the polarizer is 1.3 times or higher a contractile force in a direction parallel to the absorption axis of the polarizer.

[2] The liquid crystal display device according to [1], in which a modulus of elasticity in the direction orthogonal to the absorption axis of the polarizer is preferably in a range of 1.5 times to 4 times the modulus of elasticity in the direction parallel to the absorption direction of the polarizer.

[3] The liquid crystal display device according to [1] or [2], in which the second protective film in the front-side polarizing plate is preferably a film including a (meth) acrylic resin or a cellulose acylate resin.

[4] The liquid crystal display device according to any one of [1] to [3], in which the contractile force in the direction orthogonal to the absorption axis of the polarizer is preferably 1.4 times or higher the contractile force in the direction parallel to the absorption axis of the polarizer.

[5] The liquid crystal display device according to any one of [1] to [4], in which, in the rear polarizer, a photoelastic coefficient of a protective film on a liquid crystal cell side is preferably $11 \times 10^{-12}$/Pa or lower.

[6] The liquid crystal display device according to any one of [1] to [5], in which the rear polarizer has a first protective film, a polarizer, and a second protective film in this order from the surface side opposite to the liquid crystal cell,
the first protective film in the rear polarizer is a film including a polyester resin or a polycarbonate resin as a main component,
a retardation Re in an in-plane direction of the first protective film in the rear polarizer is 3000 nm or higher,
the second protective film in the rear polarizer is a film including a (meth)acrylic resin or a cellulose acylate rein, and
in the second protective film in the rear polarizer, a contractile force in the direction orthogonal to the absorption axis of the polarizer is preferably 1.3 times or higher a contractile force in the direction parallel to an absorption-axis direction of the polarizer.

[7] The liquid crystal display device according to any one of [1] to [6], in which thicknesses of the two glass substrates configuring the liquid crystal cell are respectively 0.5 mm or smaller.

The liquid crystal display device of the present invention is capable of suppressing luminance unevenness at the four corners of the panel when a backlight is turned on after the liquid crystal display device has been stored in a hot and humid environment.

BRIEF DESCRIPTION OF THE DRAWINGS

FIG. 1 is a schematic view illustrating a section of an example of a liquid crystal display device of the present invention.

DESCRIPTION OF THE PREFERRED EMBODIMENTS

Hereinafter, a liquid crystal display device of the present invention will be described in detail.

The description of configuration conditions described below will be, in some cases, based on a typical embodiment of the present invention, but the present invention is not limited to such embodiments. Meanwhile, in the present specification, numerical ranges expressed using "to" refer to ranges including the numerical values before and after the "to" as the upper limit value and the lower limit value.

[Liquid Crystal Display Device]

A liquid crystal display device of the present invention includes a liquid crystal cell having a liquid crystal layer between two glass substrates, a front-side polarizing plate provided on a front side of the liquid crystal cell, a rear polarizer provided on a rear side of the liquid crystal cell, and a backlight provided on a rear side of the rear polarizer, in which the front-side polarizing plate has a first protective film, a polarizer, and a second protective film in this order from a surface side opposite to the liquid crystal cell, the first protective film is a film including a polyester resin or a polycarbonate resin as a main component, an Re of the first protective film is 3000 nm or higher, an equilibrium moisture content of the second protective film at 25° C. and a relative humidity of 60% is in a range of 1% to 3%, and, in the second protective film, a contractile force in a direction orthogonal to an absorption axis of the polarizer is 1.3 times or higher a contractile force in a direction parallel to the absorption axis of the polarizer.

With the above-described configuration, the liquid crystal display device of the present invention is capable of suppressing luminance unevenness at the four corners of a panel when the backlight is turned on after the liquid crystal display device has been stored in a hot and humid environment.

Generally, due to a force contracting the polarizing plate including moisture in a process of drying the polarizing plate in a highly humid environment, the panel warps, and luminance unevenness is caused. In the configuration of the liquid crystal display device, since the degree of sealing is higher on the backlight side, a front polarizing plate on a viewer side contracts more strongly than a rear polarizing plate on a backlight side. The contractile force in the polarizing plate is determined by the integrating accumulation of the contractile forces in the first protective film, the polarizer, and the second protective film. In addition, a larger force is exerted in the longitudinal direction of the panel than in the lateral direction of the panel. As a result, the panel warps so as to curve in a concave shape in the longitudinal direction of the panel.

In order to decrease the degree of curving of the concave shape, it is necessary to weaken the contractile force in the longitudinal direction (generally, corresponding to the MD direction of the protective film or the absorption-axis direction of PVA) of the panel in the front polarizing plate or strengthen the contractile force in the longitudinal direction (generally, corresponding to the TD direction of the protective film or the transmission-axis direction of PVA) of the panel in the rear polarizing plate. In this way, the protective film is capable of mitigating the warping of the panel by weakening the contractile force in the MD direction and strengthening the contractile force in the TD direction.

In the present invention, the effect of the present invention can be obtained by weakening the contractile force in the MD direction of the second protective film.

When a film in which the contractile force in the direction orthogonal to the absorption axis of the polarizer is 1.3 times or higher the contractile force in the direction parallel to the absorption axis of the polarizer is used as the second protective film disposed on a liquid crystal cell side in the front-side polarizing plate, it is possible to suppress luminance unevenness at the four corners of the panel when the backlight is turned on after the liquid crystal display device has been stored in a hot and humid environment. In the present invention, the following fact is used: when a hydrophilic film having an equilibrium moisture content in a specific range is used, if the film is stretched in a certain direction (for example, in the absorption-axis direction of the polarizer, that is, the MD direction), compared with a case in which the film is not stretched in the stretching direction (MD direction), the contractile force in the stretching direction (MD direction) generated when the film is placed in a highly humid environment becomes smaller, and a force bending the liquid crystal panel in the stretching direction (MD direction) becomes smaller. The contractile force is considered to be proportional to the product of the film thickness of the protective film, the modulus of elasticity, and the dimensional change. When the film is stretched in a certain direction (MD direction), the modulus of elasticity becomes greater in the stretching direction (MD direction), which affects the panel such that it warps more significantly. However, the dimensional change due to moisture in the stretching direction (MD direction) becomes smaller to an equal or greater extent, which affects the panel such that it warps only slightly. In the case of a hydrophilic film having a high moisture content, since the effect of decreasing the dimensional change due to moisture makes a greater contribution to the entire contractile force than the effect of increasing the modulus of elasticity in the stretching direction (MD direction), it is possible to mitigate warping toward the first protective film in the front-side polarizing plate, that is, warping in the stretching direction (MD direction).

Meanwhile, a hydrophobic film such as a film including a polyester resin which is used as the first protective film disposed on the surface side opposite to the liquid crystal cell side in the front-side polarizing plate is an anisotropic film having a high retardation Re in the in-plane direction. When uniaxially stretched, the first protective film in the front-side polarizing plate can be easily made into the above-described anisotropic film having a high retardation Re in the in-plane direction. There is no particular limitation regarding the direction in which the first protective film in the front-side polarizing plate is uniaxially stretched; however, when the film is stretched in a direction (TD direction) orthogonal to the absorption axis of the polarizer, compared with a case in which the film is not stretched in the TD direction, the contractile force in the TD direction when the film is placed in a highly humid environment becomes greater, and a force bending the liquid crystal panel in the TD direction becomes greater, which are preferable. That is, the first protective film in the front-side polarizing plate is preferably stretched in the direction orthogonal to the absorption axis of the polarizer (TD direction) since it is then possible to decrease the force bending the liquid crystal panel in the MD direction and to suppress luminance unevenness at the four corners of the panel when the backlight is turned on after the liquid crystal display device has been stored in a hot and humid environment by suppressing the warping of the panel in the MD direction.

<Configuration>

FIG. 1 illustrates a schematic view of a preferred example of the liquid crystal display device of the present invention.

A liquid crystal display device 50 illustrated in FIG. 1 includes a liquid crystal cell 22 having a liquid crystal layer between two glass substrates (not illustrated) having a thin thickness, for example, a thickness of 0.5 mm or smaller,
- a front-side polarizing plate 21 provided on the front side of the liquid crystal cell 22,
- a rear polarizer 41 provided on the rear side of the liquid crystal cell 22, and
- a backlight 26 provided on the rear side of the rear polarizer 41, and
- the front-side polarizing plate 21 has a first protective film 1, a polarizer 3, and a second protective film 2 in this order from the surface side opposite to the liquid crystal cell 22.

The front-side (viewer-side) polarizing plate 21 preferably includes the polarizer (reference number 3 in the drawing) having polarization performance, the first protective film (reference number 1 in the drawing) attached to one surface of the polarizer by means of an adhesion layer 1 (reference number 11 in the drawing), and the second protective film (reference number 2 in the drawing) attached to the other surface of the polarizer by means of an adhesion layer 2 (reference number 12 in the drawing).

The front-side polarizing plate is preferably disposed so that a direction of the first protective film with a high modulus of elasticity, preferably, the TD direction, coincides with a direction orthogonal to the absorption-axis direction of the polarizer. In addition, the front-side polarizing plate is preferably disposed so that a direction of the second protective film with a high modulus of elasticity, preferably, the MD direction, coincides with the absorption-axis direction of the polarizer.

The rear polarizer 41 is not particularly limited, and may be the same polarizing plate as the front-side polarizing plate 21 or a well-known polarizing plate.

In a case in which the polarizing plate of the present invention is used for both the front-side polarizing plate and the rear polarizer, for the above-described reasons, in the front-side polarizing plate, the contractile force in the absorption-axis direction (DM direction) decreases, and the contractile force in the transmission-axis direction (TD direction) of the rear polarizer in a crossed nicol arrangement does not decrease or increases, and thus the difference between the contractile force in the front-side polarizing plate and the contractile force in the rear polarizer becomes small, that is, it is possible to mitigate warping occurring in a direction opposite to that of the liquid crystal cell, which is preferable.

In a case in which a well-known polarizing plate is used as well, a polarizing plate that decreases the difference in the contractile force between the front-side polarizing plate and the rear polarizer, that is, a polarizing plate capable of mitigating warping in a direction opposite to that of the liquid crystal cell is preferably selected.

The thickness of the glass substrate (not illustrated) in the liquid crystal cell 22 is preferably 0.5 mm or smaller, more preferably 0.4 mm or smaller, and particularly preferably 0.3 mm or smaller.

The liquid crystal display device can be formed according to the related art. That is, a liquid crystal display device is generally formed by appropriately assembling a liquid crystal cell, a polarizer or the protective film, and, as necessary, a constituent component such as an illumination system, and incorporating a drive circuit into the assembly, and, in the present invention, there is no particular limitation except for the fact that the polarizing plate or the protective film is used, and the liquid crystal display device can be formed according to the related art. Regarding the liquid crystal cell as well, an arbitrary-type liquid crystal cell such as a TN-type liquid crystal cell, a STN-type liquid crystal cell, a π-type liquid crystal cell, a VA-type liquid crystal cell, or an in-plane switching-type liquid crystal cell can be used.

It is possible to form an appropriate liquid crystal display device such as a liquid crystal display device having the polarizing plates or the protective films disposed on either or both sides of the liquid crystal cell or a liquid crystal display device in which a backlight is used as the illumination system. In this case, the protective films can be installed on either or both sides of the liquid crystal cell. In a case in which the polarizing plates or the protective films are provided on both sides, the polarizing plates or the protective films may be identical to or different from each other.

Furthermore, when forming the liquid crystal display device, it is possible to form one or more layers of appropriate components such as a diffusion plate, an anti-glare layer, an antireflection film, a protective plate, a prism array, a lens array sheet, a light diffusion plate, and a backlight at an appropriate location.

The liquid crystal display preferably includes a polarizing plate described below and a liquid crystal display element. Here, the liquid crystal display element is typically a liquid crystal panel which includes a liquid crystal cell having a liquid crystal encapsulated between upper and lower substrates and displays an image using the alignment state of the liquid crystal being changed by the application of voltage, but the polarizing plate of the present invention can also be applied to a variety of well-known displays such as a plasma display panel, a CRT display, and an organic EL display. As described above, in a case in which the polarizing plate including the first protective film with a high retardation is applied to a liquid crystal display element, it is possible to prevent the liquid crystal display element from warping.

Here, rainbow-like color spots are attributed to the retardation in the first protective film with a high retardation and the emission spectra of a backlight light source. In the related art, as the backlight light source in the liquid crystal display device, a fluorescent lamp such as a cold-cathode tube or a hot-cathode tube has been used. The spectral distribution of the fluorescent lamp such as a cold-cathode tube or a hot-cathode tube exhibits emission spectra having a plurality of peaks, and a white light source is obtained by mixing these discontinuous emission spectra together. In a case in which a film with a high retardation transmits light, the film exhibits different intensities of transmitted light rays depending on wavelengths. Therefore, when the backlight light source has a discontinuous emission spectrum, only light rays with specific wavelengths are strongly transmitted, and rainbow-like color spots are generated.

The liquid crystal display device of the present invention includes the backlight light source and the liquid crystal cell disposed between two polarizing plates as constituent members. In addition, the liquid crystal display device may also appropriately have additional constituent members such as a color filter, a lens film, a diffusion sheet, and an antireflection film The configuration of the backlight may be an edge light mode backlight in which a light guide plate, a reflection plate, and the like are used as constituent members or a direct backlight mode backlight; however, in the present invention, a white light-emitting diode (white LED) is preferably used as the backlight light source in the liquid crystal display device from the viewpoint of improving rainbow-like unevenness. In the present invention, the white LED refers to a fluorescent body-type element, that is, an element emitting white light by combining a light-emitting diode that emits blue light or ultraviolet light, in which a compound semiconductor is used, and a fluorescent body. As the fluorescent body, an yttrium-aluminum-garnet-based yellow fluorescent body, a terbium-aluminum-garnet-based yellow fluorescent body, or the like is used. Among these, a white light-emitting diode including a light-emitting element which is a combination of a blue light-emitting diode in which a compound semiconductor is used and an yttrium-aluminum-garnet-based yellow fluorescent body has a continuous and wide emission spectrum and also has excellent luminance efficiency, and is thus preferable as the backlight light source in the liquid crystal display device of the present invention. Meanwhile, the continuous emission spectrum means that there are no wavelengths in at least the visible light range at which the intensity of light becomes zero. In addition, since the present invention makes a white LED with low power consumption available for a wide range of use, it also becomes possible to exhibit an effect of energy saving.

There is a description in WO2011/162198A regarding a mechanism for suppressing the generation of rainbow-like spots using the above-described aspect, and the content of this publication is incorporated into the present invention.

In the liquid crystal display device having the polarizing plate disposed on the incidence ray side (light-source side), the liquid crystal cell, and the polarizing plate disposed on the outgoing-light side (viewer side), a polarizer protective film on the outgoing-light side of the polarizing plate disposed on the outgoing-light side is preferably the first protective film with a high retardation in the in-plane direction and, furthermore, a polarizer protective film disposed on the incidence-ray side of the polarizing plate on the incidence-ray side is also preferably the first protective film with a high retardation in the in-plane direction. In a case in which the first protective film with a high retardation in the in-plane direction is disposed at a location other than those described above, there are cases in which the polarization characteristics of the liquid crystal cell are changed. Since the use of the first protective film with a high retardation in the in-plane direction is preferred at a location at which the polarization characteristics are not required, the first protective film with a high retardation in the in-plane direction is preferably used as a protective film in the polarizing plate at specific locations as described above.

<Method for Adhering Polarizing Plate to Liquid Crystal Display Device>

As a method for adhering a polarizing plate described below to the liquid crystal display device, a well-known method can be used. A roll-to-panel manufacturing method can also be used and is preferred in terms of improving productivity and yield. The roll-to-panel manufacturing method is described in JP2011-48381A, JP2009-175653A, JP4628488B, JP4729647B, WO2012/014602A, WO2012/014571A, and the like, but is not limited thereto.

{Front-Side Polarizing Plate}

The front-side polarizing plate used in the liquid crystal display device of the present invention has the first protective film, the polarizer, and the second protective film in this order from the surface side opposite to the liquid crystal cell, the first protective film in the front-side polarizing plate is a film including a polyester resin or a polycarbonate resin as a main component, the retardation Re in the in-plane direction of the first protective film in the front-side polarizing plate is 3000 nm or higher, the equilibrium moisture content of the second protective film in the front-side polarizing plate at 25° C. and a relative humidity of 60% is in a range of 1% to 3%, and, in the second protective film in the front-side polarizing plate, the contractile force in the direction orthogonal to the absorption axis of the polarizer is 1.3 times or higher the contractile force in the direction parallel to the absorption axis of the polarizer.

<Configuration>

The front-side polarizing plate has the first protective film, the polarizer, and the second protective film in this order.

Regarding the shape of the polarizing plate, not only a polarizing plate with an aspect of a film segment cut to have a size so that the polarizing plate can be incorporated into the liquid crystal display device as it is but also a polarizing plate with an aspect of a roll of a long polarizing plate produced through continuous production (for example, an aspect of a roll with a length of 2500 m or longer or 3900 m or longer) can be used. In order to use the polarizing plate for a large-screen liquid crystal display device, the width of the polarizing plate is preferably set to 1470 mm or longer.

(Other Layers)

The front-side polarizing plate may have layers other than the first protective film, the polarizer, and the second protective film. Examples of the other layers include an easy-adhesion layer, a hard coat layer, and other well-known functional layers. The polarizing plate preferably includes an easy-adhesion layer and a hard coat layer on the first protective film for the purpose of preventing a ghost image, suppressing glare, and suppressing scratches.

FIG. 1 illustrates an example of the liquid crystal display device (reference number 50 in the drawing) of the present invention in which a polarizing plate including other layers is used as the front-side polarizing plate (reference number 21 in the drawing). The front-side polarizing plate 21 illustrated in FIG. 1 includes an easy-adhesion layer (reference number 14 in the drawing) and a hard coat layer (reference number 15 in the drawing) on the first protective film (reference number 1 in the drawing).

Examples of well-known layers other than the first protective film, the polarizer, and the second protective film include an antireflection layer, a luminance-improving layer, a forward scattering layer, and an anti-glare (glare-proof) layer. The antireflection layer, the luminance-improving layer, the forward scattering layer, the anti-glare layer, and other functional layers are described in "0257" to "0276" of JP2007-86748A, and it is possible to produce a polarizing plate functionalized on the basis of this description. In addition, as another functional layer, an optically anisotropic layer may be formed.

Hereinafter, preferred aspects of a polarizer and a protective film which configure the polarizing plate used in the liquid crystal display device of the present invention and preferred aspects of methods for manufacturing the polarizer and the protective film will be described.

As the polarizer, a polarizer manufactured using a well-known method of the related art can be used, and a polyvinyl alcohol-based polarizer is preferred. For example, a polarizer obtained by treating a film made of a hydrophilic polymer such as an ethylene-modified polyvinyl alcohol having a content of a polyvinyl alcohol or an ethylene unit in a range of 1 mol % to 4 mol %, a polymerization degree in a range of 2000 to 4000, and a saponification degree in a range of 99.0 mol % to 99.99 mol % with a dichromatic dye such as iodine and then stretching the film or a polarizer obtained by treating and aligning a plastic film such as vinyl chloride is used.

In addition, regarding a method for obtaining a polarizer film with a thickness of 10 µm or smaller by stretching and dyeing a laminated film in which a polyvinyl alcohol layer is formed on a base material, there are descriptions in JP5048120B, JP5143918B, JP4691205B, JP4751481B, and JP4751486B, and well-known techniques for these polarizers can also be preferably used for the polarizing plate of the present invention.

(Film Thickness of Polarizer)

The film thickness of the polarizer is not particularly limited, but is preferably in a range of 5 µm to 30 µm and more preferably in a range of 10 µm to 20 µm from the viewpoint of the polarization degree and warping. When the film thickness of the polarizer is 30 µm or smaller, the contractile force in the polarizer does not increase, and the liquid crystal panel to which the polarizer is attached does not significantly warp, which is preferable. On the other hand, when the film thickness of the polarizer is 5 µm or larger, it is possible to sufficiently absorb light polarized in a certain direction which has passed through the polarizer, and the polarization degree does not decrease, which is preferred.

<First Protective Film>

The first protective film in the front-side polarizing plate is a film including a polyester resin or a polycarbonate resin as a main component, and the retardation Re in the in-plane direction is 3000 nm or higher.

(Resin)

As the material configuring the first protective film, for example, a polyester resin or a polycarbonate resin having excellent transparency, mechanical strength, heat stability, moisture-shielding properties, isotropic properties, and the like can be used as a main component.

The first protective film may include one or more arbitrary appropriate additives other than the above-described material. Examples of the additives include an ultraviolet absorber, particles, a lubricant, an anti-blocking agent, a heat stabilizer, an antioxidant, an antistatic agent, a light-resistant agent, an impact resistance-improving agent, a lubricant, a dye, and a pigment.

The content of the thermoplastic resin in the first protective film is preferably in a range of 50% by mass to 100% by mass, more preferably in a range of 50% by mass to 99% by mass, still more preferably in a range of 60% by mass to 98% by mass, and particularly preferably in a range of 70% by mass to 97% by mass. In a case in which the content of the thermoplastic resin in the first protective film is 50% by mass or lower, there is a concern that high transparency and the like, which are the intrinsic properties of the thermoplastic resin, may not be sufficiently developed.

The first protective film may be a single-layer film or a multi-layer film. In addition, a surface treatment may be carried out on either or both surfaces of the single-layer film or the multi-layer film, and the surface treatment may be a corona treatment, a saponification treatment, a thermal treatment, or surface reformation through ultraviolet irradiation or electron-beam irradiation, or the surface treatment may be the formation of a thin film by applying or vapor-depositing a macromolecule or a metal.

In addition, in order to improve adhesiveness to a hydrophilic macromolecular layer, a thin layer such as a primary layer (undercoat layer) may be formed.

—Polyester Resin—

The first protective film preferably includes a polyester resin as a main component.

Examples of the polyester include polyethylene terephthalate, polyethylene isophthalate, polyethylene 2,6-naphthalate, polybutylene terephthalate, and 1,4-cyclohexane dimethylene terephthalate, and, as necessary, two or more polyesters may be used. Among these, polyethylene terephthalate is preferably used.

Polyethylene terephthalate is a polyester having a structural unit derived from terephthalic acid as a dicarboxylic acid component and a structural unit derived from ethylene glycol as a diol component. Ethylene terephthalate preferably accounts for 80 mol % or more of all repeating units, and polyethylene terephthalate may include a structural unit derived from a copolymerization component other than those described above. Examples of the copolymerization component include a dicarboxylic acid component such as isophthalic acid, p-β-oxyethoxybenzoic acid, 4,4'-dicarboxydiphenyl, 4,4'-dicarboxybenzophenone, bis(4-carboxyphenyl)ethane, adipic acid, sebacic acid, sodium 5-sulfoisophthalic acid, or 1,4-dicarboxycyclohexane, and a diol component such as propylene glycol, butanediol, neopentyl glycol, diethylene glycol, cyclohexanediol, an ethylene oxide adduct of bisphenol A, polyethylene glycol, polypropylene glycol, or polytetramethylene glycol. It is also possible to use a combination of two or more dicarboxylic acid components or diol components as necessary. In addition, it is also possible to jointly use an oxycarboxylic acid such as p-oxybenzoic acid and the dicarboxylic acid component or the diol component. As the copolymerization component, a dicarboxylic acid component and/or a diol component containing a small number of amide bonds, urethane bonds, ether bonds, carbonate bonds, and the like may also be used. As a method for manufacturing polyethylene terephthalate, it is possible to apply an arbitrary manufacturing method such as a so-called direct polymerization method in which terephthalic acid, ethylene glycol, and, as necessary, other dicarboxylic acids and/or other diols are directly reacted with each other or a so-called ester-exchange reaction method in which a dimethyl ester of terephthalic acid, ethylene glycol, and, as necessary, dimethyl esters of other dicarboxylic acids and/or other diols are ester-exchange-reacted with each other.

—Polycarbonate Resin—

The first protective film preferably includes a polycarbonate resin as a main component.

A well-known resin can be used. Examples thereof include a polycarbonate resin having a bisphenol A skeleton, and a polycarbonate resin which is obtained by reacting a dihydroxy component and a carbonate precursor using an interfacial polymerization method or a melt polymerization method and is described in, for example, JP2006-277914A, JP2006-106386A, or JP2006-284703A can be preferably used. As a commercially available product, "TARFLON MD1500" (manufactured by Idemitsu Kosan Co., Ltd.) or the like can be used.

Two or more polycarbonate resins may be used together as necessary.

—Ultraviolet Absorber—

In order to prevent a liquid crystal and the like in a liquid crystal display from being degraded due to ultraviolet rays, it is also possible to add an ultraviolet absorber to the first protective film. The ultraviolet absorber is not particularly limited as long as the ultraviolet absorber is a compound having ultraviolet-absorbing performance and is capable of withstanding heat applied in a step of manufacturing the first protective film.

As the ultraviolet absorber, there are an organic ultraviolet absorber and an inorganic ultraviolet absorber, but an organic ultraviolet absorber is preferred from the viewpoint of transparency. The organic ultraviolet absorber is not particularly limited, and examples thereof include a benzotriazole-based ultraviolet absorber, a cyclic iminoester-based ultraviolet absorber, and a benzophenone-based ultraviolet absorber. A benzotriazole-based ultraviolet absorber or a cyclic iminoester-based ultraviolet absorber is more preferred from the viewpoint of durability. In addition, it is also possible to jointly use two or more ultraviolet absorbers.

The benzotriazole-based ultraviolet absorber is not limited to what will be listed below, and examples thereof include 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl]-2H-benzotriazole, 2-[2'-hydroxy-3'-tert-butyl-5'-(methacryloyloxyethyl)phenyl]-2H-benzotriazole, 2-[2'-hydroxy-5'-tert-butyl-3'-(methacryloyloxyethyl)phenyl]-2H-benzotriazole, 2-[2'-hydroxy-5'-(methacryloyloxyethyl)phenyl]-5-chloro-2H-benzotriazole, 2-[2'-hydroxy-5'-(methacryloyloxyethyl)phenyl]-5-methoxy-2H-benzotriazole, 2-[2'-hydroxy-5'-(methacryloyloxyethyl)phenyl]-5-cyano-2H-benzotriazole, 2-[2'-hydroxy-5'-(methacryloyloxyethyephenyl]-5-tert-butyl-2H-benzotriazole, and 2-[2'-hydroxy-5'-(methacryloyloxyethyl)phenyl]-5-nitro-2H-benzotriazole In addition, examples of a commercially available product thereof include the above-described benzotriazole-based ultraviolet absorber, and it is possible to use the benzotriazole-based ultraviolet absorber after being dispersed in water using an emulsifier as necessary or as it is. Additionally, examples of a water-based benzotriazole-based ultraviolet absorber include NEWCOAT UVA-204W (trade name, manufactured by Shin-Nakamura Chemical Co., Ltd.) and SE-2538E (trade name, manufactured by Taisei Fine Chemical Co., Ltd.).

The cyclic iminoester-based ultraviolet absorber is not limited to what will be described below, and examples thereof include 2-methyl-3,1-benzoxazin-4-one, 2-butyl-3, 1-benzoxazin-4-one, 2-phenyl-3,1-benzoxazin-4-one, 2-(1- or 2-naphthyl)-3,1-benzoxazin-4-one, 2-(4-biphenyl)-3,1-benzoxazin-4-one, 2-p-nitrophenyl-3,1-benzoxazin-4-one, 2-m-nitrophenyl-3,1-benzoxazin-4-one, 2-p-benzoylphenyl-3,1-benzoxazin-4-one, 2-p-methoxyphenyl-3,1-benzoxazin-4-one, 2-o-methoxyphenyl-3,1-benzoxazin-4-one, 2-cyclohexyl-3,1-benzoxazin-4-one, 2-p-(or m-)phthalimidephenyl-3,1-benzoxazin-4-one, N-phenyl-4-(3,1-benzoxazin-4-on-2-yl)phthalimide, N-benzoyl-4-(3,1-benzoxazin-4-on-2-yl)aniline, N-benzoyl-N-methyl-4-(3,1-benzoxazin-4-on-2-yl)aniline, 2-(p-(N-methylcarbonyephenyl)-3,1-benzoxazin-4-one, 2,2'-bis(3,1-benzoxazin-4-one), 2,2'-ethylenebis(3,1-benzoxazin-4-one), 2,2'-tetramethylenebis(3,1-benzoxazin-4-one), 2,2'-decamethylenebis(3,1-benzoxazin-4-one), 2,2'-(1,4-phenylene)bis[4H-3,1-benzoxazin-4-one][also referred to as 2,2'-p-phenylenebis(3,1-benzoxazin-4-one)], 2,2'-m-phenylenebis(3,1-benzoxazin-4-one), 2,2'(4,4'-diphenylene)bis(3,1- benzoxazin-4-one), 2,2'-(2,6- or 1,5-naphthylene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), 2,2'-(2-chloro-p-phenylene)bis(3,1-benzoxazin-4-one), 2,2'-(1,4-cyclohexylene)bis(3,1-benzoxazin-4-one), 1,3,5-tri(3,1-benzoxazin-4-on-2-yl)benzene, 1,3,5-tri(3,1-benzoxazin-4-on-2-yl)naphthalene, 2,4,6-tri(3,1-benzoxazin-4-on-2-yl)naphthalene, 2,8-dimethyl-4H,6H-benzo(1,2-d;5,4-d')bis(1,3)-oxazine-4,6-dione, 2,7-dimethyl-4H,9H-benzo(1,2-d;4,5-d')bis(1,3)-oxazine-4,9-dione, 2, 8-diphenyl-4H,8H-benzo(1,2-d;5,4-d')bis(1,3)-oxazine-4,6-dione, 2,7-diphenyl-4H,9H-benzo(1,2-d;4,5-d')bis(1,3)-oxazine-4,6-dione, 6,6'-bis(2-methyl-4H,3,1-benzoxazin-4-one), 6,6'-bis(2-ethyl-4H,3,1-benzoxazin-4-one), 6,6'-bis(2-phenyl-4H,3,1-benzoxazin-4-one), 6,6'-methylenebis(2-methyl-4H,3,1-benzoxazin-4-one), 6,6'-methylenebis(2-phenyl-4H,3,1-benzoxazin-4-one), 6,6'-ethylenebis(2-methyl-4H,3,1-benzoxazin-4-one), 6,6'-ethylenebis(2-phenyl-4H,3,1-benzoxazin-4-one), 6,6'-butylenebis(2-methyl-4H,3,1-benzoxazin-4-one), 6,6'-butylenebis(2-phenyl-4H,3,1-benzoxazin-4-one), 6,6'-oxybis(2-methyl-4H,3,1-benzoxazin-4-one), 6,6'-oxybis(2-phenyl-4H,3,1-benzoxazin-4-one), 6,6'-sulfonylbis(2-methyl-4H,3,1-benzoxazin-4-one), 6,6'-sulfonylbis(2-phenyl-4H,3,1-benzoxazin-4-one), 6,6'-carbonylbis(2-methyl-4H,3,1-benzoxazin-4-one), 6,6'-carbonylbis(2-phenyl-4H,3,1-benzoxazin-4-one), 7,7'-methylenebis(2-methyl-4H,3,1-benzoxazin-4-one), 7,7'-methylenebis(2-phenyl-4H,3,1-benzoxazin-4-one), 7,7'-bis(2-methyl-4H,3,1-benzoxazin-4-one), 7,7'-ethylenebis(2-methyl-4H,3,1-benzoxazin-4-one), 7,7'-oxybis(2-methyl-4H,3,1-benzoxazin-4-one), 7,7'-sulfonylbis(2-methyl-4H,3,1-benzoxazin-4-one), 7,7'-carbonylbis(2-methyl-4H,3,1-benzoxazin-4-one), 6,7'-bis(2-methyl-4H,3,1-benzoxazin-4-one), 6,7'-bis(2-phenyl-4H,3,1-benzoxazin-4-one), 6,7'-methylenebis(2-methyl-4H,3,1-benzoxazin-4-one), and 6,7'-methylenebis(2-phenyl-4H,3,1-benzoxazin-4-one).

Among the above-described compounds, in a case in which the color tone is taken into account, a benzoxazinone-based compound which is not easily tinted to be yellow is preferably used, and, as an example thereof, a compound represented by General Formula (1) illustrated below is more preferably used.

General Formula (1)

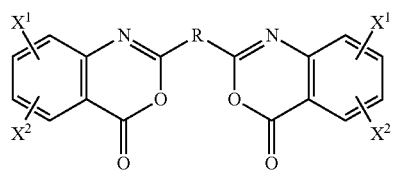

In General Formula (1), R represents a divalent aromatic hydrocarbon group, and each of $X^1$ and $X^2$ is independently selected from hydrogen or a group of the following functional groups, but is not necessarily limited thereto.

Group of functional groups: an alkyl group, an aryl group, a heteroaryl group, a halogen, an alkoxyl group, an aryloxy group, a hydroxyl group, a carboxyl group, an ester group, and a nitro group.

Among the compounds represented by General Formula (1), in the present invention, 2,2'-(1,4-phenylene)bis[4H-3,1-benzoxazin-4-one] is particularly preferred.

The amount of the ultraviolet absorber in the first protective film is generally 10.0% by mass or lower and preferably in a range of 0.3% by mass to 3.0% by mass. In a case in which the amount of the ultraviolet absorber included exceeds 10.0% by mass, the ultraviolet absorber bleeds out on the surface, and there is a concern that surface functions such as an adhesion property may deteriorate.

In addition, in the case of the multilayer-structured first protective film, a film with a structure of at least three layers is preferred, and the ultraviolet absorber is preferably formulated into an interlayer. When the ultraviolet absorber is formulated into an interlayer, it is possible to prevent the compound from bleeding out on the surface of the film, and consequently, the characteristics, such as an adhesion property, of the film can be maintained.

(Characteristics of First Protective Film)
—Phase Difference—

In the first protective film, the retardation Re (the value of phase difference) in the in-plane direction is preferably 3000 nm or higher, more preferably in a range of 3000 nm to 30000 nm, still more preferably in a range of 4000 nm to 20000 nm, and particularly preferably in a range of 6000 nm to 15000 nm. When the value of the in-plane phase difference is set to 3000 nm or higher, there is a tendency that rainbow-like unevenness becomes barely visible when the polarizing plate of the present invention is incorporated into the liquid crystal display device. When the value of the in-plane phase difference is set to 30000 nm or lower, the thickness can be decreased, and it is possible to produce a film having excellent brittleness and handling properties.

The rainbow-like unevenness appears when light incident in an inclined direction from the backlight light source on the polarizing plate including a polymer film with high birefringence, specifically, Re in a range of 500 nm or higher and lower than 3000 nm as the protective film is observed from the viewer side and, particularly, becomes significant in a liquid crystal display device including a light source having a luminous line spectrum, for example, a cold-cathode tube, as the backlight.

In a case in which a white light source having a continuous emission spectrum is used as the backlight light source, the Re of the first protective film is preferably in the above-described range since rainbow-like unevenness barely becomes visible.

The rainbow-like unevenness can be reduced by setting an Nz value representing a relationship between Re and Rth to an appropriate value, and the absolute value of the Nz value is preferably 2.0 or lower, more preferably in a range of 0.5 to 2.0, and still more preferably in a range of 0.5 to 1.5 in terms of the effect of reducing the rainbow-like unevenness and manufacturing suitability.

Since the rainbow-like unevenness is caused by incidence ray, generally, the rainbow-like unevenness is observed on a white screen.

The value Re of the in-plane phase difference of the first protective film is represented by Formula (4) shown below.

$$Re = (nx - ny) \times y_1 \qquad (4)$$

Here, nx represents the refractive index of the first protective film in an in-plane slow-axis direction, ny represents the refractive index of the first protective film in an in-plane fast-axis direction (a direction orthogonal to the in-plane slow-axis direction), and $y_1$ is the thickness of the first protective film.

The retardation Rth of the first protective film in the thickness direction is represented by Formula (5) shown below.

$$Rth=\{(nx+ny)/2-nz\} \times y_1 \quad (5)$$

Here, nz represents the refractive index of the first protective film in the thickness direction.

In addition, the Nz value of the first protective film is preferably 2.0 or lower. Meanwhile, the Nz value of the first protective film is represented by Formula (6) shown below.

$$Nz=(nx-nz)/(nx-ny) \quad (6)$$

In the present specification, Re, Rth, and Nz at a wavelength of λ nm can be measured as described below.

The alignment-axis directions of the first protective film were obtained using two polarizing plates, and the first polarizing plate was cut to a 4 cm×2 cm rectangular shape so that the alignment-axis directions were orthogonal to each other, thereby producing a measurement sample. For this sample, the refractive indexes (Nx and Ny) of the two orthogonal axes and the refractive index (Nz) in the thickness direction were obtained using an Abbe refractometer NAR-4T (manufactured by Atago Co., Ltd., a measurement wavelength of 589 nm), and the absolute value (|Nx−Ny|) of the difference in refractive index between the two axes was used as the anisotropic property (ΔNxy) of the refractive index. The thickness yl (nm) of the first protective film was measured using an electric micrometer (manufactured by Fine Ryuf Co., Ltd., MILLITRON 1245D) and was converted to a value in nanometer units. Re, Rth, and Nz were respectively computed from the measurement values of Nx, Ny, Nz, and $y_1$.

Re and Rth can be adjusted to be desired values using the kind of thermoplastic resin used for the film, the amounts of the thermoplastic resin and the additives, the addition of a retardation-developing agent, the film thickness of the film, and the stretching direction and stretch ratio of the film.

—Water Vapor Permeability—

The water vapor permeability of the film is measured on the basis of JIS Z-0208 under conditions of 40° C. and a relative humidity of 90%.

The water vapor permeability decreases when the film thickness of the film increases and increases when the film thickness decreases. Therefore, for samples with different film thicknesses, it is necessary to set the thickness standard to 40 μm and convert the water vapor permeability. The film thickness can be converted according to the following expression.

Expression: the water vapor permeability at an equivalent thickness of 40 μm=the actually-measured water vapor permeability×the actually-measured film thickness (μm)/40 (μm)

As a method for measuring the water vapor permeability, it is possible to apply the method described in "The Measurement of the Amount of Water Vapor Transmitted (a mass method, a thermometer method, a vapor pressure method, an adsorption-amount method)" pp. 285 to 294 in "The Properties of Macromolecules II" (Lectures on the Testing for Macromolecules 4, published by Kyoritsu Shuppan Co., Ltd.).

The water vapor transmission rate of the first protective film is preferably in a range of 0 g/m²/day to 100 g/m²/day from the viewpoint of hydrophobilizing the film and is more preferably in a range of 0 g/m²/day to 50 g/m²/day and still more preferably in a range of 10 g/m²/day to 30 g/m²/day.

—Equilibrium Moisture Content—

The moisture content (equilibrium moisture content) of the first protective film is not affected by the film thickness, and the moisture content at 25° C. and a relative humidity of 60% is more preferably lower than 1% by mass and still more preferably lower than 0.5% by mass. A resin with a high moisture content in which the equilibrium moisture content is less than 1% by mass is preferred since it is possible to reduce the contractile force in the absorption-axis direction (MD direction) of the polarizer during MD stretching.

Regarding a method for measuring the moisture content, the moisture content of a 7 mm×35 mm film specimen was measured using a moisture measurement instrument and a specimen-drying device "CA-03" and "VA-05" {both manufactured by Mitsubishi Chemical Corporation} according to the Karl Fischer method. The moisture content can be computed by dividing the amount (g) of moisture by the mass (g) of the specimen.

—Modulus of Elasticity—

In the first protective film, the modulus of elasticity at 25° C. and a relative humidity of 60% in the absorption-axis direction of the polarizer (preferably the handling direction of the first protective film, that is MD direction) is not particularly limited, but is preferably in a range of 1.0 GPa or higher and lower than 4.0 GPa, more preferably in a range of 1.1 GPa to 3.5 GPa, and still more preferably in a range of 1.2 GPa to 3.0 GPa.

Here, the handling direction of the film (the MD direction or the longitudinal direction) refers to a handling direction (the MD direction) during the production of the film, and the width direction refers to a direction orthogonal to the handling direction during the production of the film (the perpendicular direction or the TD direction). The handling direction (the MD direction or the longitudinal direction) of the first protective film is preferably parallel to the absorption axis of the polarizer in the polarizing plate of the present invention. Meanwhile, in the present specification, "being parallel" means not only being completely parallel but also being deviated from being completely parallel within an optically-allowable angular range.

The direction perpendicular to the handling direction of the first protective film (the TD direction) is preferably a direction in which the modulus of in-plane elasticity of the first protective film is highest. The direction in which the modulus of in-plane elasticity of the first protective film is highest can be determined as described below: the speeds of sound in a film, the humidity of which has been adjusted to be a desired value for two hours in an atmosphere of 25° C. and a relative humidity of 60%, are measured in 32 directions equally separated around 360 degrees using a determination device of the speeds of sound "SST-2501, Nomura Shoji Co., Ltd." in an atmosphere of 25° C. and a relative humidity of 60%, and the direction with the fastest speed of sound is determined as the direction with the highest modulus of in-plane elasticity.

The modulus of elasticity of the film can be adjusted to be a desired value using the kind and amount added of the thermoplastic resin in a first protective film material, the selection of additives (particularly, the particle diameter, refractive index, and amount added of particles of a matting agent), and, furthermore, the conditions for manufacturing the film (the stretch ratio and the like).

The modulus of elasticity was measured as described below: a specimen with a length in the measurement direction of 200 mm and a width of 10 mm was prepared, and was left to stand in an environment of 25° C. and a relative humidity of 60% for 48 hours, and then the modulus of elasticity of the sample with a shape having a width of 10 mm and a length between chucks of 100 mm was measured using a STROGRAPH V10-C manufactured by Toyo Seiki Kogyo Co., Ltd.

Even in a case in which the polarizer and either or both the first protective film and the second protective film are attached to each other, it is possible to separate out the single body of the film and measure the modulus of elasticity thereof. As a method for separating out the single body of the film, it is possible to use, for example, a method in which a polyvinyl alcohol, which is the polarizer, is softened by immersing the polarizing plate in hot water or the like or a method in which the single body of the film is mechanically peeled off.

In the first protective film in the front-side polarizing plate, the ratio of the modulus of elasticity between the modulus of elasticity of the polarizer in a direction orthogonal to the absorption axis and the modulus of elasticity of the polarizer in the absorption-axis direction is preferably in a range of 0.1 times to 4 times, more preferably in a range of 1 time to 4 times, and particularly preferably in a range of 2 times to 3 times.

—Ratio Between Rates of Dimensional Change Due to Moisture—

Regarding the dimensional change due to moisture when the first protective film is left to stand under conditions of 25° C. and a relative humidity of 80% for 24 hours and then is left to stand under conditions of 25° C. and a relative humidity of 10% for 24 hours, the ratio between rates of dimensional change due to moisture of the dimensional change due to moisture in the direction orthogonal to the absorption axis of the polarizer with the dimensional change due to moisture in the absorption axis of the polarizer is preferably 2.5 times or lower, more preferably 2 times or lower, and particularly preferably 1 time or lower.

—Film Thickness—

The thickness of the first protective film is preferably set in a range of 10 µm to 200 µm, more preferably set in a range of 15 µm to 100 µm, and particularly preferably set in a range of 20 µm to 80 µm. When the thickness of the first protective film is 10 µm or larger, there is a tendency that it is easy to handle the first protective film, and, when the thickness thereof is 200 µm or smaller, there is a tendency that an advantage of the reduction of the manufacturing cost can be obtained from a decrease in the thickness.

(Method for Manufacturing First Protective Film)

The first protective film is preferably stretched in the width direction from the viewpoint of controlling the modulus of elasticity to fall within the above-described range. A method for manufacturing the first protective film is not particularly limited. In order to impart the above-described characteristics to the first protective film, the first protective film is preferably manufactured using the following method, It is preferable that, first, a resin used for the first protective film (for example, a polyester resin) is melted and extracted into a film shape, and is cooled and solidified using a casting drum so as to produce an un-stretched film, then, if necessary, a coating fluid for forming an easy-adhesion layer is applied, and this un-stretched film is stretched at a temperature in a range of Tg° C. of the polyester film to (Tg+60°) C. so as to be stretched 3 times to 10 times, and preferably, 3 times to 7 times, in the width direction. The first protective film is preferably uniaxially stretched in the width direction from the viewpoint of significantly developing the retardation Re in the in-plane direction.

Next, it is preferable to carry out a thermal treatment (here, referred to as thermal fixing) at a temperature in a range of 140° C. to 220° C. for 1 second to 60 seconds. The temperature of the thermal fixing is more preferably in a range of 150° C. to 220° C. and particularly preferably in a range of 150° C. or higher and lower than 220° C.

Furthermore, it is preferable to carry out a re-thermal treatment (referred to as relaxation treatment) while contracting the first protective film 0% to 20% in the longitudinal direction and/or in the width direction at a temperature 10° C. to 20° C. lower than the thermal fixing temperature. In this method, since the film does not frequently come into contact with a roller, fine scratches and the like are less likely to be generated on the surface of the film than in the above-described methods, and thus the method is advantageously applied to optical use. Meanwhile, the glass transition temperature of the film will be indicated by Tg. When the thermal fixing temperature is in a range of 150° C. or higher and lower than 220° C., the alignment direction of the polyester deviates only slightly, and the thermal dimensional change also becomes small, and thus the peeling or cracking of the hard coat layer does not easily occur.

<Second Protective Film>

In the second protective film in the front-side polarizing plate, the equilibrium moisture content at 25° C. and a relative humidity of 60% is in a range of 1% to 3%, and the contractile force in the direction orthogonal to the absorption axis of the polarizer is 1.3 times or higher the contractile force in the direction parallel to the absorption axis of the polarizer.

As the material configuring the second protective film, for example, a thermoplastic resin having excellent transparency, mechanical strength, heat stability, moisture-shielding properties, isotropic properties, stretching properties, and the like can be preferably used. Specific examples of the above-described thermoplastic resin include a cellulose acylate resin described below such as triacetyl cellulose and a (meth)acrylic resin. In addition, in order to improve adhesiveness to a hydrophilic macromolecular layer, a thin layer such as a primary layer (undercoat layer) may be formed.

(Resin)

The material configuring the second protective film is not particularly limited.

The second protective film preferably includes a resin. A well-known resin can be used as the resin, and there is no particular limitation within the scope of the gist of the present invention. Examples of the resin include a cellulose acylate resin, a (meth)acrylic resin, a cycloolefin-based resin, and a polyester-based resin, and a (meth)acrylic resin or a cellulose acylate is preferred, and a cellulose acylate resin is more preferred.

(1) Cellulose Acylate Resin

Hereinafter, a cellulose acylate resin that can be used for the second protective film will be described in detail.

The degree of substitution of cellulose acylate refers to the proportion of cellulose which is present in the structural unit ((β)1,4-glycoside-bonded glucose) of cellulose and has three acylated hydroxyl groups. The degree of substitution (acylation degree) can be computed by measuring the amount of bonded fatty acid per structural unit mass of cellulose. In the present invention, the degree of substitution of a cellulose body can be computed from the peak intensity ratio of carbonyl carbon in an acyl group by dissolving the cellulose body in a solvent such as deuterium-substituted dimethyl sulfoxide and obtaining a $^{13}$C-NMR spectrum. The degree of substitution can be obtained by substituting residual hydroxyl groups in cellulose acylate with another acyl group that is different from the acyl group originally included in cellulose acylate, and carrying out a $^{13}$C-NMR measurement. The detail of the measurement method is described in Tezuka et al. (Carbohydrate. Res., 273 (1995) 83 to 91).

The total degree of acyl substitution of the cellulose acylate is preferably in a range of 2.0 to 2.97, more preferably in a range of 2.2 to 2.95, and particularly preferably in a range of 2.3 to 2.95.

The acyl group in the cellulose acylate is particularly preferably an acetyl group, a propionyl group, or a butyryl group, and is more particularly preferably an acetyl group.

A mixed fatty acid ester including two or more kinds of acyl group can also be preferably used as the cellulose acylate in the invention. In this case as well, the acyl group is preferably an acetyl group or an acyl group having 3 to 4 carbon atoms. In a case in which the mixed fatty acid ester is used, the degree of substitution of the acetyl group is preferably lower than 2.5, and more preferably lower than 1.9. Meanwhile, the degree of substitution of the acyl group having 3 to 4 carbon atoms is preferably in a range of 0.1 to 1.5, more preferably in a range of 0.2 to 1.2, and particularly preferably in a range of 0.5 to 1.1.

In the present invention, two kinds of cellulose acylate having different substituents and/or degrees of substitution may be jointly used, or a mixture thereof may be used, and a film having multiple layers made of different cellulose acylates may be formed using a co-flow casting method.

Furthermore, a mixed acid ester having a fatty acid acyl group and a substituted or unsubstituted aromatic acid acyl group described in "0023" to "0038" of JP2008-20896A can also be preferably used in the present invention.

The cellulose acylate preferably has a mass-average degree of polymerization in a range of 250 to 800, and more preferably has a mass-average degree of polymerization in a range of 300 to 600.

In addition, the cellulose acylate preferably has a number-average molecular weight in a range of 70000 to 230000, more preferably has a number-average molecular weight in a range of 75000 to 230000, and most preferably has a number-average molecular weight in a range of 78000 to 120000.

The cellulose acylate can be synthesized using an acid anhydride or an acid chloride as an acylation agent. In a case in which the acylation agent is an acid anhydride, an organic acid (for example, acetic acid) or methylene chloride is used as a reaction solvent. In addition, a protonic catalyst such as sulfuric acid can be used as a catalyst. In a case in which the acylation agent is an acid chloride, a basic compound can be used as the catalyst. In a synthesis method that is most usual in an industrial sense, the cellulose ester is synthesized by esterification of cellulose using a mixed organic acid component including an acetyl group and an organic acid (acetic acid, propionic acid, or butyric acid) corresponding to another acyl group or an acid anhydride thereof (acetic acid anhydride, propionic acid anhydride, or butyric anhydride).

In the above-described method, cellulose such as a cotton linter or wood pulp is, in many cases, activated using an organic acid such as acetic acid, and then is esterified in the presence of a sulfuric acid catalyst using a liquid mixture of the above-described organic acid component. It is common to use an excess amount of the organic acid anhydride component with respect to the amount of a hydroxyl group present in cellulose. In the esterification treatment, a hydrolysis reaction (depolymerization reaction) of a cellulose main chain (($\beta$)1,4-glycoside bond) as well as the esterification reaction proceed. As the hydrolysis reaction of the main chain proceeds, the polymerization degree of the cellulose ester decreases, and the properties of a cellulose ester film being manufactured degrade. Therefore, the reaction conditions such as a reaction temperature are preferably determined in consideration of the polymerization degree or molecular weight of a cellulose ester to be obtained.

(2) (Meth)Acrylic Resin

The (meth)acrylic resin refers to both a methacrylic resin and an acrylic resin, and a derivative of acrylate/methacrylate, particularly, a (co)polymer of acrylate ester/methacrylate ester is also considered as the (meth)acrylic resin.

Furthermore, in addition to a methacrylic resin and an acrylic resin, a (meth)acrylic polymer having a ring structure in the main chain, a polymer having a lactone ring, a maleic anhydride-based polymer having a succinic anhydride ring, a polymer having a glutraric anhydride ring, and a glutarimide ring-containing polymer can also be considered as the (meth)acrylic resin.

—(Meth)Acrylic Polymer—

The structural repeating unit of the (meth)acrylic polymer is not particularly limited. The (meth)acrylic polymer preferably has a structural repeating unit derived from a (meth) acrylic acid ester monomer as the repetition structural unit.

The (meth)acrylic acid ester is not particularly limited, and examples thereof include an acrylic acid ester such as methyl acrylate, ethyl acrylate, n-butyl acrylate, isobutyl acrylate, t-butyl acrylate, cyclohexyl acrylate, or benzyl acrylate; and a methacrylic acid ester such as methyl methacrylate, ethyl methacrylate, propyl methacrylate, n-butyl methacrylate, isobutyl methacrylate, t-butyl methacrylate, cyclohexyl methacrylate, or benzyl methacrylate. Only one (meth)acrylic acid ester may be used, or two or more (meth)acrylic acid esters may be jointly used. Among these, methyl methacrylate is particularly preferred in terms of excellent heat resistance and transparency.

In a case in which the (meth)acrylic acid ester is used as a main component, the content proportion of the (meth) acrylic acid ester in a monomer component that is subjected to a polymerization step is preferably in a range of 50% by mass to 100% by mass, more preferably in a range of 70% by mass to 100% by mass, still more preferably in a range of 80% by mass to 100% by mass, and particularly preferably in a range of 90% by mass to 100% by mass in terms of sufficiently exhibiting the effect of the present invention.

The glass transition temperature Tg of the resin including the (meth)acrylic acid ester as a main component is preferably in a range of 80° C. to 120° C.

In addition, the weight-average molecular weight of the resin including the (meth)acrylic acid ester as a main component is preferably in a range of 50,000 to 500,000.

In order to enhance handling properties by improving flexibility, it is preferable to formulate particles of a rubber elastic body into the (meth)acrylic resin. The particles of a rubber elastic body are particles including a rubber elastic body, and may be particles made only of a rubber elastic body or multilayer-structured particles having layers of a rubber elastic body. An acryl-based elastic polymer is preferably used in terms of the surface hardness, light resistance, and transparency of the film.

The particles of a rubber elastic body including the acryl-based elastic polymer can be obtained with reference to JP2012-180422A, JP2012-032773A, and JP2012-180423A.

The number-average particle diameter of the particles of a rubber elastic body is preferably in a range of 10 nm to 300 nm and more preferably in a range of 50 nm to 250 nm.

A (meth)acrylic resin composition forming a (meth) acrylic resin film is preferably obtained by formulating 25% by mass to 45% by mass of the particles of a rubber elastic body having a number-average particle diameter in a range of 10 nm to 300 nm into a transparent acrylic resin.

—(Meth)Acrylic Polymer Having Ring Structure in Main Chain—

The (meth)acrylic polymer preferably has a ring structure in the main chain. When a ring structure is introduced into the main chain, it is possible to improve heat resistance by enhancing the rigidity of the main chain.

In the present invention, among (meth)acrylic polymers having a ring structure in the main chain, any one of a polymer having a lactone ring structure in the main chain, a maleic anhydride-based polymer having a succinic anhydride ring in the main chain, a polymer having a glutaric anhydride ring structure in the main chain, and a polymer having a glutarimide ring structure in the main chain is preferred. Among these, a polymer having a lactone ring structure in the main chain or a polymer having a glutarimide ring structure in the main chain is more preferred.

Hereinafter, the above-described polymers having a ring structure in the main chain will be sequentially described.

(2-1) (Meth)Acrylic Polymer Having Lactone Ring Structure in Main Chain

The (meth)acrylic polymer having a lactone ring structure in the main chain (hereinafter, also referred to as lactone ring-containing polymer) is not particularly limited as long as the polymer is a (meth)acrylic polymer having a lactone ring structure in the main chain, but the (meth)acrylic polymer preferably has a lactone ring structure represented by General Formula (100) illustrated below.

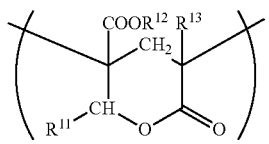

General Formula (100)

In General Formula (100), each of $R^{11}$, $R^{12}$, and $R^{13}$ independently represents a hydrogen atom or an organic residue having 1 to 20 carbon atoms, and the organic residue may include an oxygen atom.

Here, the organic residue having 1 to 20 carbon atoms is preferably a methyl group, an ethyl group, an isopropyl group, an n-butyl group, a t-butyl group, or the like.

The content proportion of the lactone ring structure represented by General Formula (100) in the structure of the lactone ring-containing polymer is preferably in a range of 5% by mass to 90% by mass, more preferably in a range of 10% by mass to 70% by mass, still more preferably in a range of 10% by mass to 60% by mass, and particularly preferably in a range of 10% by mass to 50% by mass. When the content proportion of the lactone ring structure is set to 5% by mass or higher, there is a tendency that the heat resistance and surface hardness of the obtained polymer improve, and, when the content proportion of the lactone ring structure is set to 90% by mass or lower, there is a tendency that the molding workability of the obtained polymer improves.

Meanwhile, the content proportion of the lactone ring structure can be computed from the following expression.

The content proportion (% by mass) of the lactone ring=$B \times A \times M_R/M_m$ (In the expression, B represents the mass content proportion of a raw material monomer having a structure that is involved in lactone cyclization (hydroxyl group) in a monomer composition used for the copolymerization, $M_R$ represents the formula weight of a lactone ring structural unit being generated, $M_m$ represents the molecular weight of the raw material monomer having the structure that is involved in the lactone cyclization (hydroxyl group), and A represents the lactone cyclization ratio.)

In addition, the lactone cyclization ratio can be computed from, for example, in a case in which a lactone cyclization reaction is accompanied by a dealcoholization reaction, the theoretical weight loss amount and the thermogravimetric loss ratio caused by the dealcoholization reaction from 150° C. before the beginning of weight loss to 300° C. before the beginning of the decomposition of the polymer.

There is no particular limitation regarding a method for manufacturing the (meth)acrylic resin having the lactone ring structure. Preferably, the (meth)acrylic resin having the lactone ring structure is obtained by producing a polymer (p) having a hydroxyl group and an ester group in a molecular chain through the polymerization of a predetermined monomer illustrated below and then carrying out lactone cyclization condensation in which the lactone ring structure is introduced into the polymer by heating the obtained polymer (p) in a temperature range of 75° C. to 120° C.

In the polymerization step, a polymerization reaction of a monomer component including a monomer represented by General Formula (101) illustrated below is caused, thereby obtaining a polymer having a hydroxyl group and an ester group in a molecular chain.

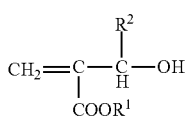

General Formula (101)

(In the formula, each of $R^1$ and $R^2$ independently represents a hydrogen atom or an organic residue having 1 to 20 carbon atoms.)

Examples of the monomer represented by General Formula (101) include methyl 2-(hydroxymethyl)acrylate, ethyl 2-(hydroxymethyl)acrylate, isopropyl 2-(hydroxymethyl)acrylate, normal butyl 2-(hydroxymethyl)acrylate, and t-butyl 2-(hydroxymethyl)acrylate. Among these, methyl 2-(hydroxymethyl)acrylate or ethyl 2-(hydroxymethyl)acrylate is preferred, and methyl 2-(hydroxymethyl)acrylate is particularly preferred since the effect of improving heat resistance is strong. Only one monomer represented by General Formula (101) may be used, or two or more monomers may be jointly used.

The content proportion of the monomer represented by General Formula (101) in monomer components that are subjected to the polymerization step has a lower limit value in a preferred range from the viewpoint of heat resistance, solvent resistance, and surface hardness and has an upper limit value in a preferred range from the viewpoint of the molding workability of the obtained polymer. On the basis of the above-described viewpoint, the range of the content proportion thereof is preferably in a range of 5% by mass to 90% by mass, more preferably in a range of 10% by mass to 70% by mass, still more preferably in a range of 10% by mass to 60% by mass, and particularly preferably in a range of 10% by mass to 50% by mass.

The monomer components that are subjected to the polymerization step may also include a monomer other than the monomer represented by General Formula (101). The above-described monomer is not particularly limited, and preferred examples thereof include a (meth)acrylic acid ester, a hydroxyl group-containing monomer, an unsaturated carboxylic acid, and a monomer represented by General Formula (102) illustrated below. Only one monomer other than the monomer represented by General Formula (101) may be used, or two or more monomers may be jointly used.

The weight-average molecular weight of the lactone ring-containing polymer is preferably in a range of 10,000 to 2,000,000, more preferably in a range of 20,000 to 1,000,000, and particularly preferably in a range of 50,000 to 500,000.

The mass reduction ratio of the lactone ring-containing polymer in a measurement of the dynamic TG in range of 150° C. to 300° C. is preferably 1% or lower, more preferably 0.5% or lower, and still more preferably 0.3% or lower. As a method for measuring the dynamic TG, the method described in JP2002-138106A can be used.

Since the lactone ring-containing polymer has a high cyclization condensation reaction rate, the dealcoholization reaction does not frequently occur in a process for manufacturing a molded product, and it is possible to prevent defect of bubbles or silver streaks generated in a molded product after molding which is caused by the alcohol. Furthermore, since the high cyclization condensation reaction rate causes a sufficient amount of the lactone ring-containing structure to be introduced into the polymer, the obtained lactone ring-containing polymer has high heat resistance.

In a case in which a chloroform solution with a concentration of 15% by mass is used, the coloration degree (YI) of the lactone ring-containing polymer is preferably 6 or lower, more preferably 3 or lower, still more preferably 2 or lower, and particularly preferably 1 or lower. When the coloration degree (YI) is 6 or lower, a disadvantage of transparency being impaired by coloration does not easily occur, and thus the lactone ring-containing polymer with such coloration degree can be preferably used in the present invention.

The 5% mass reduction temperature of the lactone ring-containing polymer in a thermal mass analysis (TG) is preferably 330° C. or higher, more preferably 350° C. or higher, and still more preferably 360° C. or higher. The 5% mass reduction temperature in the thermal mass analysis (TG) is an index of heat stability, and, when the 5% mass reduction temperature is set to 330° C. or higher, there is a tendency that sufficient heat stability is easily exhibited. In the thermal mass analysis, an apparatus for measuring the dynamic TG can be used.

The glass transition temperature (Tg) of the lactone ring-containing polymer is preferably in a range of 115° C. to 180° C., more preferably in a range of 120° C. to 170° C., and still more preferably in a range of 125° C. to 160° C.

(2-2) Maleic Anhydride-Based Polymer Having Succinic Anhydride Ring in Main Chain A succinic anhydride structure is preferably formed in the molecular chains of a polymer (in the main skeleton of the polymer) since strong heat resistance is imparted to a (meth)acrylic resin which is a copolymer, and the glass transition temperature (Tg) also becomes high.

The glass transition temperature (Tg) of the maleic anhydride-based polymer having a succinic anhydride ring in the main chain is preferably in a range of 110° C. to 160° C., more preferably in a range of 115° C. to 160° C., and still more preferably in a range of 120° C. to 160° C.

In addition, the weight-average molecular weight of the maleic anhydride-based polymer having a succinic anhydride ring in the main chain is preferably in a range of 50,000 to 500,000.

The maleic anhydride unit used for the copolymerization with the (meth)acrylic resin is not particularly limited, and examples thereof include the maleic acid-denatured resins described in JP2008-216586A, JP2009-052021A, JP2009-196151A, and JP2012-504783A.

Meanwhile, these resins do not limit the present invention.

As a commercially available product of the maleic acid-denatured resin, DELPET 980N manufactured by Asahi Kasei Chemical Corporation, which is a maleic acid-denatured MAS resin (methyl methacrylate-acrylonitrile-styrene copolymer), can be preferably used.

In addition, there is no particular limitation regarding a method for manufacturing the (meth)acrylic resin having a maleic anhydride unit, and a well-known method can be used.

(2-3) Polymer having glutaric anhydride ring structure in main chain

The polymer having a glutaric anhydride ring structure in the main chain refers to a polymer having a glutaric anhydride unit.

The polymer having a glutaric anhydride unit preferably has a glutaric anhydride unit represented by General Formula (300) illustrated below (hereinafter, referred to as glutaric anhydride unit).

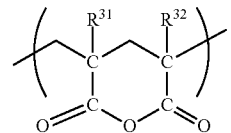

General Formula (300)

In General Formula (300), each of $R^{31}$ and $R^{32}$ independently represents a hydrogen atom or an organic residue having 1 to 20 carbon atoms. The organic residue may include an oxygen atom. $R^{31}$ and $R^{32}$ particularly preferably represent mutually identical or different hydrogen atoms or alkyl groups having 1 to 5 carbon atoms.

The polymer having a glutaric anhydride unit is preferably a (meth)acrylic polymer having a glutaric anhydride unit. The (meth)acrylic polymer preferably has a glass transition temperature (Tg) of 120° C. or higher in terms of heat resistance.

The glass transition temperature (Tg) of the polymer having a glutaric anhydride ring structure in the main chain is preferably in a range of 110° C. to 160° C., more preferably in a range of 115° C. to 160° C., and still more preferably in a range of 120° C. to 160° C.

In addition, the weight-average molecular weight of the polymer having a glutaric anhydride ring structure in the main chain is preferably in a range of 50,000 to 500,000.

The content of the glutaric anhydride unit in the (meth)acrylic polymer is preferably in a range of 5% by mass to 50% by mass and more preferably in a range of 10% by mass to 45% by mass. When the content of the glutaric anhydride unit is set to 5% by mass or higher, more preferably, 10% by mass or higher, it is possible to obtain an effect of improving heat resistance, and furthermore, it is also possible to obtain an effect of improving weather resistance.

(2-4) (Meth)Acrylic Polymer Having Glutarimide Ring Structure in Main Chain

The (meth)acrylic polymer having a glutarimide ring structure in the main chain (hereinafter, also referred to as glutarimide-based resin) is capable of developing a preferred characteristics balance in terms of optical characteristics or heat resistance since the polymer has a glutarimide ring structure in the main chain. The (meth)acrylic polymer having a glutarimide ring structure in the main chain preferably includes at least a glutarimide resin having 20% by mass or more of a glutarimide unit represented by General Formula (400) illustrated below:

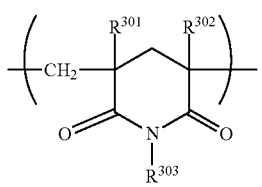

General Formula (400)

(in the formula, each of $R^{301}$, $R^{302}$, and $R^{303}$ is independently hydrogen or an unsubstituted or substituted alkyl group, cycloalkyl group, or aryl group having 1 to 12 carbon atoms)

In a preferred glutarimide unit configuring the glutarimide-based resin used in the present invention, $R^{301}$ and $R^{302}$ are hydrogen or methyl groups, and $R^{303}$ is a methyl group or a cyclohexyl group. The (meth)acrylic polymer may have a single kind of glutarimide unit or multiple kinds of glutarimide unit in which $R^{301}$, $R^{302}$, and $R^{303}$ are different from each other.

—Method for Manufacturing Polarizing Plate Protective Film Including (Meth)Acrylic Polymer as Main Component—

Hereinafter, a method for manufacturing a thermoplastic resin including the (meth)acrylic polymer as a main component will be described in detail.

In order to produce the polarizing plate protective film using the (meth)acrylic polymer as a main component, for example, film raw materials are pre-blended together using a well-known mixer of the related art such as an Omni mixer, and then the obtained mixture is extracted and kneaded. In this case, the mixer used for the extraction and kneading is not particularly limited, and it is possible to use a well-known mixer of the related art, for example, an extruder such as a uniaxial extruder or a biaxial extruder or a pressurization kneader.

Examples of a method for molding a film include well-known film-molding methods of the related art such as a solution casting method, a melt-extrusion method, a calendering method, and a compression molding method. Among these film-molding methods, the melt-extrusion method is particularly preferred.

As the melt-extrusion method, for example, a T die method or an inflation method can be used, and, at this time, the molding temperature may be appropriately adjusted to be a desired temperature depending on the glass transition temperature of the film raw materials and is not particularly limited. The molding temperature is preferably in a range of 150° C. to 350° C. and more preferably in a range of 200° C. to 300° C.

In a case in which a film is molded using a T die method, it is possible to obtain a roll-shaped film by attaching a T die to the tip portion of a well-known uniaxial extruder or biaxial extruder and winding a film extruded in a film shape. At this time, when the film is stretched in the extrusion direction by appropriately adjusting the temperature of the winding roll to be a desired temperature, it is also possible to uniaxially stretch the film. In addition, when the film is stretched in a direction perpendicular to the extrusion direction, it is also possible to simultaneously or sequentially stretch the film biaxially.

The polarizing plate protective film including the (meth)acrylic polymer as a main component is desirably a stretched film from the viewpoint of the TD/MD contractile force ratio. In the case of a stretched film, the polarizing plate protective film may be either a uniaxially-stretched film or a biaxially-stretched film. In the case of a biaxially-stretched film, the polarizing plate protective film may be either a simultaneously-biaxially-stretched film or a sequentially-biaxially-stretched film. In the case of a biaxially-stratched film, mechanical strength improves, and film performance improves. In a case in which the (meth)acrylic polymer is a (meth)acrylic polymer having a cyclic structure in the main chain, when another thermoplastic resin is mixed with the polymer, it is possible to suppress an increase in phase difference even when the film is stretched and to obtain a film maintaining optical isotropic properties.

The thickness of the polarizing plate protective film obtained using the (meth)acrylic polymer as a main component is preferably in a range of 5 μm to 80 μm and more preferably in a range of 10 μm to 40 μm. When the thickness of the film is smaller than 5 μm, the strength of the film decreases, and, in some cases, the film significantly crimps in a durability test in which the film is attached to another component. Conversely, when the thickness thereof exceeds 80 μm, the transparency of the film degrades, a water vapor-permeating property becomes weak, and, in a case in which a water-based adhesive is used when the film is attached to another component, there are cases in which the drying speed of water, which is a solvent, becomes slow.

A resin mixture of a cellulose acylate-based resin and the (meth)acrylic resin is also preferred. The mass ratio between the cellulose acylate-based resin and the (meth)acrylic resin is preferably in a range of 70:30 to 15:85, more preferably in a range of 70:30 to 30:70, and still more preferably in a range of 49:51 to 30:70.

The (meth)acrylic resin that is jointly used with a cellulose acylate-based resin may be a homopolymer of one derivative of (meth)acrylic acid or a copolymer of two or more derivatives of (meth)acrylic acid, or may be a copolymer with another monomer capable of copolymerizing with the above-described polymers.

Examples of a copolymerization component capable of copolymerizing with a derivative of (meth)acrylic acid include α,β-unsaturated acids such as acrylic acid and methacrylic acid, unsaturated acids such as unsaturated group-containing divalent carboxylic acids such as maleic acid, fumaric acid, and itaconic acid, aromatic vinyl compounds such as styrene, o-methyl styrene, m-methyl styrene, p-methyl styrene, 2,4-dimethyl styrene, p-ethyl styrene, p-tert-butyl styrene, a-methyl styrene, and a-methyl-p-methyl styrene, α,β-unsaturated nitriles such as acrylonitrile and methacrylonitrile, unsaturated carboxylic acid anhydrides such as a lactone ring unit, a glutaric anhydride unit, a glutarimide unit, and maleic anhydride, and maleimides such as maleimide, and N-substituted maleimide.

As the (meth)acrylic resin that is jointly used with a cellulose-based resin, the derivative of (meth)acrylic acid, and other copolymerizable monomers, it is possible to use those described in JP2009-122664A, JP2009-139661A, JP2009-139754A, JP2009-294262A, and WO2009/054376A. Meanwhile, these resins, derivatives, and monomers do not limit the present invention, and can be used singly or in a combination of two or more thereof The weight-average molecular weight Mw of the (meth) acrylic resin that is jointly used with a cellulose-based resin is preferably 80000 or higher. When the weight-average molecular weight Mw of the (meth)acrylic resin is 80000 or higher, mechanical strength is high, and handling suitability in manufacturing a film is excellent. From this viewpoint, the weight-average molecular weight Mw of the acrylic resin is preferably 100000 or higher. In addition, from the viewpoint of improving compatibility with cellulose ester, the weight-average molecular weight Mw of the (meth) acrylic resin is preferably 3000000 or lower and more preferably 2000000 or lower.

As the (meth)acrylic resin that is jointly used with a cellulose-based resin, a commercially available product can be used. Examples thereof include DELPET 60N, DELPET 80N (manufactured by Asahi Kasei Chemicals Corporation), DIANAL BR80, DIANAL BR85, DIANAL BR88, DIANAL BR102 (manufactured by Mitsubishi Rayon Co., Ltd.), and KT75 (manufactured by Denki Kagaku Kogyo Kabushiki Kaisha.), and two or more of these resins can be jointly used.

(Additives)

The second protective film may include an organic acid or well-known additives used for other polarizing plate protective films within the scope of the gist of the present invention. The inclusion thereof can help the control of the rate of dimensional change due to moisture. The molecular weight of the additive is not particularly limited, and additives described below can be preferably used.

The addition of additives does not only control the rate of dimensional change due to moisture but also cause a useful effect to be exhibited from the viewpoint of improving the thermal properties, optical properties, and mechanical properties of the film, imparting flexibility, imparting water-absorption resistance, and the reformation of the film such as the reduction of moisture transmittance.

For example, for the control of mechanical properties, a plasticizer may be added to the film, and, as a reference of the plasticizer, a variety of known ester-based plasticizers such as phosphoric acid esters, citric acid esters, trimellitic acid esters, and sugar esters or the description of polyester-based polymers in Paragraphs "0042" to "0068" of WO2011/102492A can be referred to.

In addition, regarding the control of optical properties, in order to impart ultraviolet or infrared-absorbing performance, the description in Paragraphs "0069" to "0072" of WO2011/102492A can be referred to, and, in order to allow the adjustment of the phase difference of the film or the control of developing properties, an existing retardation adjuster can be used. The inclusion thereof can help the control of the rate of dimensional change due to moisture. The molecular weight of the additive is not particularly limited, and additives described below can be preferably used.

The second protective film may include one or more arbitrary appropriate additives in addition to the above-described materials. Examples of other additives include an ultraviolet absorber, an antioxidant, a lubricant, a mold release agent, a coloration inhibitor, a flame retardant, a nucleating agent, an antistatic agent, a pigment, and a coloration agent. The content of the thermoplastic resin in the second protective film is preferably in a range of 50% by mass to 100% by mass, more preferably in a range of 50% by mass to 99% by mass, still more preferably in a range of 60% by mass to 98% by mass, and particularly preferably in a range of 70% by mass to 97% by mass. In a case in which the content of the thermoplastic resin in the second protective film is 50% by mass or lower, high transparency and the like which are the intrinsic properties of the thermoplastic resin cannot be sufficiently developed.

(Characteristics of Second Protective Film)

—Equilibrium Moisture Content—

The moisture content (equilibrium moisture content) of the second protective film is not affected by the film thickness, and the moisture content at 25° C. and a relative humidity of 60% is in a range of 1% by mass to 3% by mass. The moisture content thereof is more preferably in a range of 1% by mass to 2.5% by mass and more preferably in a range of 1.1% by mass to 2.1% by mass from the viewpoint of hydrophilizing the film. A resin with a high moisture content in which the equilibrium moisture content is 1% by mass or higher is preferred since it is possible to reduce the contractile force in the absorption-axis direction (MD direction) of the polarizer during MD stretching.

—Modulus of Elasticity—

In the second protective film, the modulus of elasticity at 25° C. and a relative humidity of 60% in the absorption-axis direction (the MD direction) of the polarizer is preferably in a range of 2.0 GPa or higher and lower than 8.0 GPa, more preferably in a range of 2.2 GPa to 6.0 GPa, and still more preferably in a range of 2.5 GPa to 5.0 GPa.

—Ratio Between Rates of Dimensional Change Due to Moisture—

Regarding the dimensional change due to moisture when the second protective film is left to stand under conditions of 25° C. and a relative humidity of 80% for 24 hours and then is left to stand under conditions of 25° C. and a relative humidity of 10% for 24 hours, the ratio between rates of dimensional change due to moisture of the dimensional change due to moisture in the direction orthogonal to the absorption axis of the polarizer between the dimensional change due to moisture in the direction parallel to the absorption axis of the polarizer is preferably 3 times or lower, more preferably in a range of 1 time to 3 times, and particularly preferably in a range of 1.1 times to 2.7 times.

—Contractile Force Ratio—

In the second protective film in the front-side polarizing plate, the contractile force in the direction orthogonal to the absorption axis of the polarizer is 1.3 times or higher, more preferably 1.4 times or higher, and particularly preferably 1.6 times or higher the contractile force in the direction parallel to the absorption axis of the polarizer (the contractile force ratio of TD/MD). In the second protective film in the front-side polarizing plate, when the contractile force in the direction orthogonal to the absorption axis of the polarizer reaches lower than 1.3 times the contractile force in the direction parallel to the absorption axis of the polarizer, the panel warps, luminance unevenness deteriorates at the four corners of the panel when the backlight is turned on after the liquid crystal display device has been stored in a hot and humid environment, and there are cases in which display performance significantly deteriorates.

The contractile force of the film is proportional to the product of the modulus of elasticity after a hydrothermal treatment, the film thickness, and the rate of dimensional change due to moisture after the hydrotheinial treatment and can be measured using the method described in examples described below.

—Film Thickness—

The thickness of the second protective film is preferably 100 μm or smaller, more preferably in a range of 10 μm to 80 μm, still more preferably in a range of 10 μm to 60 μm, and particularly preferably in a range of 10 μm to 40 μm.

<Easy-Adhesion Layer>

The polarizing plate of the present invention preferably includes an adhesive layer as the easy-adhesion layer for adhering the polarizing plate to another member. For example, it is also possible to use a polarizer-side easy-adhesion layer as the base for the adhesion layer 1 on a surface provided with the polarizer of the first protective film in order to improve the adhesion property between the polarizer and the first protective film (Polarizer-Side Easy-Adhesion Layer)

The polarizer-side easy-adhesion layer in the present invention is a layer for improving an adhesion property to a variety of functional layers, and can be used in order to improve, for example, the adhesion property to a variety of adhesives layers used to attach the polarizer and the polyester film together.

In order to improve the adhesion property between the polyester film and the adhesive layer, compounds such as a urethane resin or polyvinyl alcohol have been studied. After further continuing the studies, it has been clarified that, in the easy-adhesion layer obtained by combining a urethane resin and polyvinyl alcohol, an adhesion property is relatively improved. In addition, as a result of a variety of studies regarding a crosslinking agent, it has been clarified that an adhesion property is relatively improved by combining an oxazoline compound and polyvinyl alcohol or an oxazoline compound and a urethane resin and finding an appropriate compositional ratio therebetween. On the basis of the above-described results, when a urethane resin, polyvinyl alcohol, and an oxazoline compound are jointly used, surprisingly, an adhesion property has been significantly improved, and an easy-adhesion layer which can be used for the protection of the polarizer has been successfully formed.

The urethane resin included in the polarizer-side easy-adhesion layer in the present invention refers to a macromolecular compound including a urethane resin in the molecule. Generally, the urethane resin is produced from a reaction between a polyol and isocyanate. Examples of the polyol include polycarbonate polyols, polyester polyols, polyether polyols, polyolefin polyols, and acryl polyols, and one compound may be used or a plurality of compounds may be used.

The polycarbonate polyol is obtained from a dealcoholization reaction between a polyhydric alcohol and a carbonate compound. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexanedimethanol, 1,7-heptanediol, 1,8-octanediol, 1,9-nonanediol, 1,10-decanediol, neopentyl glycol, 3-methyl-1,5-pentanediol, and 3,3-dimethylolheptane. Examples of the carbonate compound include dimethyl carbonate, diethyl carbonate, diphenyl carbonate, and ethylene carbonate, and examples of polycarbonate-based polyols obtained from a reaction therebetween include poly(1,6-hexylene)carbonate, and poly(3-methyl-1,5-pentylene)carbonate.

Examples of the polyester polyols include polyester polyols obtained from a reaction between a polyvalent carboxylic acid (malonic acid, succinic acid, glutaric acid, adipic acid, pimelic acid, suberic acid, sebacic acid, fumaric acid, maleic acid, terephthalic acid, isophthalic acid, or the like) or an acid anhydride thereof and a polyhydric alcohol (ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, benzene dimethanol, bishydroxyethoxybenzene, an alkyl dialkanolamine, or a lactone diol).

Examples of the polyether polyols include polyethylene glycol, polypropylene glycol, polyethylene propylene glycol, polytetramethylene ether glycol, and polyhexamethylene ether glycol.

In order to improve the adhesion property to a variety of adhesive layers, among the above-described polyols, the polycarbonate polyols are more preferably used.

Examples of a polyisocyanate compound used to obtain the urethane resin include aromatic diisocyanates such as tolylene diisocyanate, xylylene diisocyanate, methylene diphenyl diisocyanate, phenylene diisocyanate, naphthalene diisocyanate, and tolidine diisocyanate, aliphatic diisocyanates having an aromatic ring such as α,α,α',α'-tetramethyl xylylene diisocyanate, aliphatic diisocyanates such as methylene diisocyanate, propylene diisocyanate, lysine diisocyanate, trimethylhexamethylene diisocyanate, and hexamethylene diisocyanate, and alicyclic diisocyanates such as cyclohexane diisocyanate, methyl cyclohexane diisocyanate, isophorone diisocyanate, dicyclohexyl methane diisocyanate, and isopropylidene dicyclohexyl diisocyanate. One polyisocyanate compound may be used or a plurality of polyisocyanate compounds may be used.

In the synthesis of the urethane resin, a chain extender may be used. The chain extender is not particularly limited as long as the chain extender has two or more active groups which react with an isocyanate group, and, generally, a chain extender having two hydroxyl groups or amino groups can be mainly used.

Examples of the chain extender having two hydroxyl groups include aliphatic glycols such as ethylene glycol, propylene glycol, and butanediol, aromatic glycols such as xylylene glycol and bishydroxyethoxybenzene, and glycols such as ester glycols such as neopentyl glycol hydroxypivalate. In addition, examples of the chain extender having two amino groups include aromatic diamines such as tolylenediamine, xylylenediamine, and diphenyl methanediamine, aliphatic diamines such as ethylenediamine, propylenediamine, hexanediamine, 2,2-dimethyl-1,3-propanediamine, 2-methyl-1,5-pentanediamine, trimethylhexanediamine, 2-butyl-2-ethyl-1,5-pentanediamine, 1,8-octanediamine, 1,9-nonanediamine, and 1,10-decanediamine, and alicyclic diamines such as 1-amino-3-aminomethyl-3,5,5-trimethyl-cyclohexane, dicyclohexylmethanediamine, isopropylidenecyclohexyl-4,4'-diamine, 1,4-diaminocyclohexane, and 1,3-bisaminomethyl cyclohexane.

For the urethane resin in the present invention, a solvent may be used as a medium, and water is preferably used as a medium. In order to disperse or dissolve the urethane resin in water, a forced-emulsification-type urethane resin for which an emulsifier is used, a self-emulsification-type urethane resin or water-soluble urethane resin which introduces a hydrophilic group into the urethane resin, or the like can be used. Particularly, a self-emulsion-type urethane resin which introduces an ion group into the skeleton of the urethane resin and is ionomerized is preferred since the storage stability of liquid or the water resistance, transparency, and adhesiveness of the obtained easy-adhesion layer are excellent. In addition, examples of an ion group being introduced include a variety of ion groups such as a carboxyl group, sulfonic acid, phosphoric acid, phosphonic acid, and a quaternary ammonium salt, and a carboxyl group is preferred. Regarding a method for introducing a carboxyl group into the urethane resin, a variety of methods can be employed in individual phases of the polymerization reaction. Examples thereof include a method in which a resin having a carboxyl group is used as a copolymerization component in the synthesis of a prepolymer and a method in which a component having a carboxyl group is used as one component of the polyol or the polyisocyanate, or the chain extender. Particularly, a method in which a desired amount of a carboxyl group is introduced using a carboxyl group-containing diol depending on the amount of the carboxyl group-containing diol prepared is preferred. For example, it is possible to copolymerize dimethylolpropionic acid, dimethylolbutanoic acid, bis-(2-hydroxyethyl)propionic acid, bis-(2-hydroxyethyl)butanoic acid, or the like with a diol used for the polymerization of the urethane resin. In addition, the carboxyl group preferably has a form of a salt neutralized with ammonia, an amine, an alkali metal, an inorganic alkali, or the like. Ammonia, trimethylamine, and triethylamine are particularly preferred. in such a urethane resin, it is possible to use a carboxyl group from which a neutralizing agent has been removed in a drying step after coating as a crosslinking reaction point by another crosslinking agent. Therefore, the polyurethane resin has excellent stability in a liquid form before being applied, and thus it becomes possible to further improve the durability, solvent resistance, water resistance, blocking resistance, and the like of the obtained easy-adhesion layer.

The polyvinyl alcohol included in the polarizer-side easy-adhesion layer in the present invention refers to an alcohol having a polyvinyl alcohol site, and it is possible to use a well-known polyvinyl alcohol of the related art including, for example, a denatured compound obtained through the partial acetalization or butyralization of a polyvinyl alcohol. The polymerization degree of the polyvinyl alcohol is not particularly limited, and, generally, a polyvinyl alcohol with a polymerization degree of 100 or higher, preferably, in a range of 300 to 40000, is used. In a case in which the polymerization degree is lower than 100, there are cases in which the water resistance of the easy-adhesion layer degrades. In addition, the saponification degree of the polyvinyl alcohol is not particularly limited, but a polyvinyl acetate-saponified substance with a saponification degree of 70% by mol or higher, preferably, in a range of 70% by mol to 99.9% by mol is practically used.

The oxazoline compound included in the polarizer-side easy-adhesion layer in the present invention refers to a compound having an oxazoline group in the molecule. Particularly, a polymer having an oxazoline group is preferred and can be produced using only an addition-polymerizable oxazoline group-containing monomer or through the polymerization between an addition-polymerizable oxazoline group-containing monomer and another monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline, and one addition-polymerizable oxazoline group-containing monomer or a mixture of two or more thereof can be used. Among these, 2-isopropenyl-2-oxazoline can be easily produced in an industrial sense and is preferred. The other monomer is not particularly limited as long as the monomer is capable of copolymerizing with the addition-polymerizable oxazoline group-containing monomer, and examples thereof include (meth)acrylic acid esters of an alkyl (meth)acrylate (as an alkyl group, a methyl group, an ethyl group, an n-propyl group, an isopropyl group, an n-butyl group, an isobutyl group, a t-butyl group, a 2-ethylhexyl group, or a cyclohexyl group); unsaturated carboxylic acids such as acrylic acid, methacrylic acid, itaconic acid, maleic acid, fumaric acid, crotonic acid, styrene sulfonic acid, and salts thereof (sodium salt, potassium salt, ammonium salt, and tertiary amine salt); unsaturated nitriles such as acrylonitrile and methacrylonitile; unsaturated amides such as (meth)acrylamides, N-alkyl (meth)acrylamides, and N,N-dialkyl (meth)acrylamides, (as an alkyl group, a methyl group, an ethyl group, an n-propyl group, an isopropyl group, an n-butyl group, an isobutyl group, a t-butyl group, a 2-ethylhexyl group, or a cyclohexyl group); vinyl esters such as vinyl acetate and vinyl propionate; vinyl ethers such as methyl vinyl ether and ethyl vinyl ether; a-olefins such as ethylene and propylene; halogen-containing α,β-unsaturated monomers such as vinyl chloride, vinylidene chloride, and vinyl fluoride; and α,β-unsaturated aromatic monomers such as styrene and a-methyl styrene. One monomer can be used or two or more monomers can be used.

In addition, when the monomer has a small number of hydrophilic groups such as a polyalkylene glycol component and a large amount of the oxazoline group, the improvement in the strength of a coated film and the humidity and heat resistance can be expected.

The content of a urethane resin-derived compound in the polarizer-size easy-adhesion layer is generally in a range of 10% by mass to 80% by mass, preferably in a range of 15% by mass to 75% by mass, and more preferably in a range of 20% by mass to 50% by mass. In a case in which the amount of the urethane resin is outside the above-described range, there are cases in which the adhering force between the polyester film and the adhesive layer cannot be sufficiently obtained.

The content of a polyvinyl alcohol-derived compound in the polarizer-size easy-adhesion layer is generally in a range of 10% by mass to 80% by mass, preferably in a range of 15% by mass to 60% by mass, and more preferably in a range of 20% by mass to 50% by mass. In a case in which the content of the polyvinyl alcohol-derived compound is lower than 10% by mass, there are cases in which the adhesion property to the adhesive layer is not sufficient due to the low content of the polyvinyl alcohol component, and, when the content thereof exceeds 80% by mass, there are cases in which adhesiveness to the polyester film is not sufficient due to the low content of other components.

The content of an oxazoline compound-derived compound in the polarizer-size easy-adhesion layer is generally in a range of 10% by mass to 80% by mass, preferably in a range of 15% by mass to 60% by mass, and more preferably in a range of 20% by mass to 40% by mass. In a case in which the content of the oxazoline compound-derived compound is lower than 10% by mass, due to the low content of a crosslinking component, the easy-adhesion layer becomes brittle, and there are cases in which humidity and heat resistance degrades, and, when the content thereof exceeds 80% by mass, there are cases in which adhesiveness to the polyester film or the adhesion property to the adhesive layer is not sufficient due to the low content of other components.

In the polarizer-side easy-adhesion layer, in order to improve the state of the coated surface or transparency, a binder polymer can be jointly used in addition to a polyester resin or a polyvinyl alcohol.

The "binder polymer" in the present invention is defined as a macromolecular compound having a number-average molecular weight (Mn), which is measured through gel pelineation chromatography (GPC) according to the flow scheme for evaluating the stability of macromolecular compounds (November 1985, hosted by Chemical Substance Inquiry Commission), of 1000 or higher and capable of producing a film.

Specific examples of the binder polymer include a polyester resin, an acrylic resin, a polyvinyl (polyvinyl chloride, vinyl chloride-vinyl acetate copolymer, or the like), polyalkylene glycol, polyalkylene imine, methyl cellulose, hydroxyl cellulose, and starch.

Furthermore, in the polarizer-side easy-adhesion layer, a crosslinking agent other than the oxazoline compound can also be jointly used within the scope of the gist of the present invention. As the crosslinking agent, a variety of well-known resins can be used, and examples thereof include a melamine compound, an epoxy compound, an isocyanate compound, and a carbodiimde compound.

The melamine compound refers to a compound having a melamine skeleton in the compound. For example, an alkylolated melamine derivative, a compound partially or fully esterified by reacting an alcohol with an alkylolated melamine derivative, and a mixture thereof can be used. As the alcohol used for the esterification, methyl alcohol, ethyl alcohol, isopropyl alcohol, n-butanol, isobutanol, or the like is preferably used. In addition, the melamine compound may be either a monomer or a polymer such as a dimer, or may be a mixture thereof. Furthermore, a substance obtained by co-condensing urea or the like into a part of melamine can also be used, and a catalyst can also be used in order to enhance the reactivity of the melamine compound.

Examples of the epoxy compound include a compound having an epoxy group in the molecule, a prepolymer and a hardened substance thereof. Examples thereof include condensates of epichlorohydrin and a hydroxyl group or an amino group in ethylene glycol, polyethylene glycol, glycerin, polyglycerin, and bisphenol A, polyepoxy compounds, diepoxy compounds, monoepoxy compounds, and glycidyl amine compounds. Examples of the polyepoxy compound include sorbitol, polyglycidyl ether, polyglycerol polyglycidyl ether, pentaerythritol polyglycidyl ether, diglycerol polyglycidyl ether, triglycidyl tris(2-hydroxyethyl) isocyanate, glycerol polyglycidyl ether, trimethylol propane polyglycidyl ether; examples of the diepoxy compound include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether, polytetramethylene glycol diglycidyl ether; examples of the monoepoxy compound include allyl glycidyl ether, 2-ethylhexyl glycidyl ether, and phenyl glycidyl ether; examples of the glycidyl amine compounds include N,N,N',N'-tetraglycidyl-m-xylylene diamine, and 1,3-bis(N,N-diglycidylamino)cyclohexane.

The isocyanate compound refers to a compound having an isocyanate group in the molecule, and specific examples thereof include hexamethylene diisocyanate, trimethylhexamethylene diisocyanate, cyclohexylene diisocyanate, xylylene diisocyanate, isophorone diisocyanate, naphthalene diisocyanate, tolylene diisocyanate, and blocked bodies or derivative thereof.

Among these crosslinking agents, particularly, when the epoxy compound is jointly used, the easy-adhesion layer becomes robust, and improvement in an adhesion property or moisture and heat resistance can be expected. In addition, the crosslinking agent is preferably water-soluble or water-dispersible in a case in which the application and the like to inline coating is taken into account.

In addition, the polarizer-side easy-adhesion layer may contain particles for the purpose of improving the blocking properties and sliding properties of the easy-adhesion layer, and examples thereof include inorganic particles such as the particles of silica, alumina, or a metal oxide and organic particles such as the particles of a crosslinking macromolecule.

<<Other Additives Used for Easy-Adhesion Layer>>

Furthermore, within the scope of the gist of the present invention, a defoamer, a coating property-improving agent, a thicknener, an organic lubricant, an antistatic agent, an ultraviolet absorber, an antioxidant, a foaming agent, a dye, a pigment, or the like may be added to the polarizer-side easy-adhesion layer and a hard coat layer-side easy-adhesion layer as necessary.

In addition, a coating composition for the easy-adhesion layer used in the present invention may include a surfactant, a crosslinking agent, a dispersing agent, a thickener, a film-forming aid, an anti-blocking agent, or the like as necessary.

A variety of components in the easy-adhesion layer can be analyzed through a surface analysis, for example, TOF-SIMS.

<<Method for Manufacturing Easy-Adhesion Layer>>

In a case in which the easy-adhesion layer is provided through inline coating, it is preferable to manufacture a polyester film by producing an aqueous solution or a water dispersion of a series of the above-described compounds and applying a coating fluid having a concentration of solid contents adjusted to be in a range of approximately 0.1% by mass to 50% by mass onto the polyester film. In addition, within the scope of the gist of the present invention, the coating fluid may include a small amount of an organic solvent for the purpose of improving the dispersion properties in water and the film-producing properties. Only one organic solvent may be used, or two or more organic solvents may be appropriately used.

The film thickness of the polarizer-side easy-adhesion layer in the polyester film in the present invention is generally in a range of 0.002 μm to 1.0 μm, more preferably in a range of 0.03 μm to 0.5 μm, and still more preferably in a range of 0.04 μm to 0.2 μm. In a case in which the film thickness is smaller than 0.002 μm, there is a possibility that a sufficient adhesion property may not be obtained, and, in a case in which the film thickness exceeds 1.0 μm, there is possibility that appearance, transparency, and the blocking properties of the film may be degraded.

In the present invention, as a method for providing the easy-adhesion layer, a well-known method of the related art such as reverse gravure coating, direct gravure coating, roll coating, die coating, bar coating, or curtain coating can be used. Regarding a coating method, "Coating Methods", Maki Shoten, Yuji Harazaki (1979) describes examples thereof.

In the present invention, there is no particular limitation regarding the conditions for drying and hardening when the easy-adhesion layer is formed on the polyester film, and, for example, in a case in which the easy-adhesion layer is provided through offline coating, a thermal treatment is preferably carried out, generally, at 80° C. to 200° C. for 3 seconds to 40 seconds, and, preferably, at 100° C. to 180° C. for 3 seconds to 40 seconds.

Meanwhile, in a case in which the easy-adhesion layer is provided through inline coating, a thermal treatment is preferably carried out, generally, at 70° C. to 280° C. for 3 seconds to 200 seconds.

In addition, regardless of offline coating or inline coating, a thermal treatment and irradiation with active energy rays such as irradiation with ultraviolet rays may be jointly used as necessary. The polyester film configuring a laminate polyester film in the present invention may be subjected to a surface treatment such as a corona treatment or a plasma treatment in advance.

In a case in which the polyester film is used as the protective film for the polarizer in the polarizing plate, generally, the polarizer is attached onto the polarizer-side easy-adhesion layer side by means of an adhesive for adhering the polarizer.

As the adhesive, a well-known adhesive of the related art can be used, and examples thereof include an acrylic compound such as polyvinyl alcohol, polyvinyl butyral, or polybutyl acrylate and an epoxy-based compound having an alicyclic epoxy group exemplified by a glycidyl group or epoxycyclohexane.

For example, polyvinyl alcohol which has been uniaxially stretched and dyed with iodine or the like is preferably attached as the polarizer onto the produced adhesive layer. It is also possible to attach a protective film or a retardation film onto a side opposite to the polarizer and use the film as the polarizing plate.

Hereinafter, a method for manufacturing the polarizing plate in the present invention will be described.

<Saponification Treatment>

When an alkali saponification treatment is carried out on the polarizing plate protective film (the first protective film or the second protective film), it is possible to impart adhesiveness to a material of the polarizer such as polyvinyl alcohol and to use the film as the polarizing plate protective film As a method for saponification, the method described in Paragraphs "0211" and "0212" of JP2007-86748A can be used.

For example, the alkali saponification treatment on the polarizing plate protective film is preferably carried out in a cycle in which the surface of the film is immersed in an alkali solution, then, is neutralized with an acidic solution, is washed with water, and is dried. Examples of the alkali solution include a potassium hydroxide solution and a sodium hydroxide solution, and the concentration of hydroxide ions is preferably in a range of 0.1 mol/L to 5.0 mol/L and more preferably in a range of 0.5 mol/L to 4.0 mol/L. The temperature of the alkali solution is preferably in a range of room temperature to 90° C. and more preferably in a range of 40° C. to 70° C.

Instead of the alkali saponification treatment, the easy-adhesion process described in JP1994-94915A (JP-H6-94915A) and JP1994-118232A (JP-H6-118232A) may be carried out.

<Step of Attaching Polarizer and Protective Film>

The method for manufacturing the polarizing plate in the present invention includes a step of attaching the first protective film to one surface of the polarizer having polarization performance by means of the adhesion layer 1 and a step of attaching the second protective film to the other surface of the polarizer by means of the adhesion layer 2.

The step of attaching the first protective film to one surface of the polarizer by means of the adhesion layer 1 and the step of attaching the second protective film to the other surface of the polarizer by means of the adhesion layer 2 may be carried out simultaneously or sequentially. Among these, the step of attaching the first protective film to one surface of the polarizer by means of the adhesion layer 1 and the step of attaching the second protective film to the other surface of the polarizer by means of the adhesion layer 2 are preferably carried out simultaneously, and a step of attaching both protective films using a roll-to-roll method is more preferably carried out at the same time.

As a method for simultaneously carrying out the step of attaching both protective films using a roll-to-roll method, for example, the apparatus and the method described in JP2012-203108A can be used, and the content of JP2012-203108A is incorporated into the present invention.

The manufacturing apparatus described in JP2012-203108A is configured so that, while continuously handling the polarizer, the first protective film is attached to one surface of the polarizer, and the second protective film is attached to the other surface of the polarizer, thereby manufacturing a polarizing plate, and the polarizing plate is wound around a winding roll. Typically, protective films are respectively attached to both surfaces of a polarizer.

In the method for manufacturing the polarizer, the polarizer is preferably produced using a method in which the polarizing plate protective films are alkali-treated and are attached to both surfaces of the polarizer using an adhesive.

For the polarizing plate of the present invention, the polarizer and the first protective film are attached together by means of the adhesion layer 1, and the polarizer and the second protective film are attached together by means of the adhesion layer 2. The adhesion layer 1 and the adhesion layer 2 preferably include a curable adhesive.

It is also possible to provide the polarizer-side easy-adhesion layer on the polarizer side of the first protective film and attach the polarizer on the polarizer-side easy-adhesion layer to the polarizer-side easy-adhesion layer by means of an adhesive for adhering the polarizer.

As the adhesive used to attach the treated surface of the polarizing plate protective film and the polarizer, the adhesives exemplified as the main component of the adhesion layer 1 and the adhesion layer 2 can be used, and examples thereof include a polyvinyl alcohol-based adhesive such as polyvinyl alcohol or polyvinyl butyral or a vinyl-based latex such as butyl acrylate.

As the adhesive, a well-known adhesive of the related art can be used, and examples thereof include an acrylic compound such as polyvinyl alcohol, polyvinyl butyral, or polybutyl acrylate and an epoxy-based compound having an alicyclic epoxy group such as a glycidyl group or epoxycyclohexane.

(Water-Based Adhesive)

In the polarizing plate in the present invention, the main component of the adhesion layer 1 and the adhesion layer 2 may be a water-based adhesive (the adhesion layer 1 and the adhesion layer 2 are layers obtained by hardening a water-based adhesive), and the water-based adhesive is more preferably polyvinyl alcohol or polyvinyl butyral and particularly preferably polyvinyl alcohol.

(Active Energy Ray-Curable Adhesive)

As the adhesive, a variety of adhesives that have been thus far used for the manufacture of a polarizing plate in the related art can be used as long as the adhesive is a curable adhesive; however, from the viewpoint of weather resistance or polymerizable properties, the adhesion layer 1 and the adhesion layer 2 preferably include an adhesive that is hardened by active energy rays. Meanwhile, an aspect in which an adhesive is changed to a hardened substance of an adhesive having a different structure by a hardening reaction is also considered as an aspect of the adhesion layer 1 and the adhesion layer 2 including an adhesive. For example, a case in which, in the adhesion layer 1 and the adhesion layer 2, an adhesive that is hardened by active energy rays is fully hardened and is changed to a hardened substance of an adhesive having a different structure is also included in the present invention.

Among adhesives that are hardened by active energy rays, a cationic polymerizable compound, for example, an epoxy compound, more specifically, an active energy ray-curable adhesive including an epoxy compound not having an aromatic ring in the molecule as one of active energy ray-curable components as described in JP2004-245925A, is preferred. The above-described epoxy compound can be, for example, a hydrogenated epoxy compound obtained by nuclear-hydrogenating an aromatic polyhydroxy compound, which is a raw material for an aromatic epoxy compound represented by a diglycidyl ether of bisphenol A, and glycidyl-etherifying the nuclear-hydrogenated aromatic polyhydroxy compound, an alicyclic epoxy compound having at least one epoxy group which is bonded to an alicyclic ring in the molecule, or an aliphatic epoxy compound represented by a glycidyl ether of an aliphatic polyhydroxy compound. In addition, into the active energy ray-curable adhesive, not only the cationic polymerizable represented by an epoxy compound, generally, but also a polymerization initiator, particularly, a photocationic polymerization initiator for generating a cation or a Lewis acid through the irradiation with active energy rays and initiating the polymerization of a cationic polymerizable compound are formulated. Furthermore, a variety of additives such as a thermal-cationic polymerization initiator initiating polymerization through heating and, additionally, a photosensitizer may be formulated in.

In a case in which the protective films are attached to both surfaces of the polarizer, the compositions of the adhesives applied to the respective protective films may be identical to or different from each other; however, from the viewpoint of productivity, with an assumption that an appropriate adhering force can be obtained, the adhesives with the same composition are preferably used on both surfaces. That is, in the polarizing plate of the present invention, the adhesion layer 1 and the adhesion layer 2 preferably have the same composition.

From the viewpoint of manufacturing suitability in roll-to-roll, the polarizing plate of the present invention is preferably laminated so that the absorption axis of the polarizer and the direction (TD direction) orthogonal to the film handling direction during the manufacture of the polarizing plate protective films (the first protective film and the second protective film) become substantially orthogonal to each other. Here, "being substantially orthogonal to each other" means that the angle formed between the absorption axis of the polarizer and the TD direction of the polarizing plate protective film is in a range of 85° to 95° and preferably in a range of 89° to 91°. As long as the angle therebetween deviates to the extent of 5° or lower (preferably 1° or lower) from being orthogonal, the polarization degree performance of the polarizing plate under a crossed nicol arrangement does not easily degrade, and light slip does not easily occur, which is preferable.

In the present invention, as a method for providing the adhesion layer 1 and the adhesion layer 2, a well-known coating method of the related art such as reverse gravure coating, direct gravure coating, roll coating, die coating, bar coating, or curtain coating can be used. Regarding a coating method, "Coating Methods", Maki Shoten, Yuji Harazaki (1979) describes examples thereof.

The first protective film and the second protective film may be subjected to a surface treatment such as a saponification treatment, a corona treatment, or a plasma treatment in advance.

{Rear Polarizer}

There is no particular limitation regarding the rear polarizer.

In the protective film on the liquid crystal cell side in the rear polarizer, there are cases in which birefringence (Re and Rth) is changed due to stress or the like generated by the contraction of the polarizer. The change in birefringence caused by the above-described stress can be measured as a photoelastic coefficient, and, in the rear polarizer in the liquid crystal display device of the present invention, the photoelastic coefficient of the protective film on the liquid crystal cell side is preferably $11 \times 10^{-12}$/Pa or lower. The range of the absolute value of the photoelastic coefficient is preferably $11 \times 10^{-12}$/Pa or lower, more preferably $8 \times 10^{-12}$/Pa or lower, and still more preferably $2 \times 10^{-12}$/Pa or lower.

In the liquid crystal display device of the present invention, the rear polarizer preferably includes a first protective film, a polarizer, and a second protective film from the surface side opposite to the liquid crystal cell.

Regarding a material configuring the first protective film in the rear polarizer, there is no particular limitation, and a well-known material can be used. Examples thereof include the polyester resin used for the first protective film in the front-side polarizing plate and the resin used for the second protective film in the front-side polarizing plate.

The first protective film in the rear polarizer is preferably a film including a polyester resin or a polycarbonate resin as the main component, and a more preferred aspect thereof is the same as that of the first protective film in the front-side polarizing plate.

The retardation Re in the in-plane direction in the first protective film in the rear polarizer is preferably 3000 nm or higher, and a more preferred aspect thereof is the same as that of the first protective film in the front-side polarizing plate.

The second protective film in the rear polarizer is preferably a film including a (meth)acrylic resin or a cellulose acylate resin, and a more preferred aspect thereof is the same as that of the second protective film in the front-side polarizing plate.

In the second protective film in the rear polarizer, the contractile force in the direction orthogonal to the absorption axis of the polarizer is preferably 1.3 times or higher the contractile force in the direction parallel to the absorption axis of the polarizer, and a more preferred aspect thereof is the same as that of the second protective film in the front-side polarizing plate.

The preferred ranges of other configurations, other layers, other characteristics, and the manufacturing method for the rear polarizer are the same as the preferred ranges of other configurations, other layers, other characteristics, and the manufacturing method for the front-side polarizing plate.

EXAMPLES

Hereinafter, the characteristics of the present invention will be more specifically described using examples and comparative examples. Materials, amounts used, proportions, contents of processes, process sequences, and the like can be appropriately changed within the scope of the gist of the present invention. Therefore, the ranges for the present invention are not supposed to be restrictively interpreted by specific examples described below.

Manufacturing Example 1

As a film 1, 80 µm-long TD-stretched PET (with single-layer ultraviolet absorber added) was manufactured using the following method.
<Synthesis of Raw Material Polyester>
(Raw Material Polyester 1)
As described below, a raw material polyester 1 (Sb catalyst-based PET) was obtained using a continuous polymerization apparatus and a direct esterification method in which terephthalic acid and ethylene glycol were directly reacted with each other so as to distill water away, were esterified, and then were condensation-polymerized at a reduced pressure.
(1) Esterification Reaction
In a first esterification reaction vessel, high-purity terephthalic acid (4.7 tons) and ethylene glycol (1.8 tons) were mixed together for 90 minutes so as to form a slurry, and the slurry was continuously supplied at a flow rate of 3800 kg/h. Furthermore, an ethylene glycol solution of antimony trioxide was continuously supplied, and the components were reacted with each other under stirring at a temperature inside the reaction vessel of 250° C. over an average residence time of 4.3 hours. At this time, the antimony trioxide was continuously supplied so that the amount of Sb added reached 150 ppm in terms of the element-equivalent values.

The reaction product was moved to a second esterification reaction vessel and was reacted under stirring at a temperature inside the reaction vessel of 250° C. over an average residence time of 1.2 hours. To the second esterification reaction vessel, an ethylene glycol solution of magnesium acetate and an ethylene glycol solution of trimethyl phosphate were continuously supplied so that the amount of Mg added and the amount of P added respectively reached 65 ppm and 35 ppm in terms of the element-equivalent values.
(2) Polycondensation Reaction
The esterification reaction product obtained above was continuously supplied to a first polycondensation reaction vessel and was polycondensed under stirring at a reaction temperature of 270° C. and a pressure inside the reaction vessel of 20 Ton ($2.67 \times 10^{-3}$ MPa) over an average residence time of approximately 1.8 hours.

Furthermore, the reaction product was moved to a second polycondensation reaction vessel and was reacted (polycondensed) in the reaction vessel under stirring and under conditions of a temperature inside the reaction vessel of 276° C. and a pressure inside the reaction vessel of 5 Torr ($6.67 \times 10^{-4}$ MPa) over an average residence time of approximately 1.2 hours.

Next, the reaction product was further moved to a third polycondensation reaction vessel and was reacted (polycondensed) in the reaction vessel and under conditions of a temperature inside the reaction vessel of 278° C. and a pressure inside the reaction vessel of 1.5 Torr ($2.0 \times 10^{-4}$ MPa) over an average residence time of approximately 1.5 hours, thereby obtaining a reaction product (polyethylene terephthalate (PET)).

Next, the obtained reaction product was ejected into cold water in a strand shape and was immediately cut, thereby producing polyester pellets <section: a long diameter of approximately 4 mm and a short diameter of approximately 2 mm, length: approximately 3 mm>.

The obtained polymer had an intrinsic viscosity IV of 0.63. This polymer was used as the raw material polyester 1.

IV was obtained by dissolving a raw material polyester 1 in a mixed solvent of 1,1,2,2-tetrachloroethane and phenol (at a mass ratio of 2:3) and measuring the solution viscosity in the mixed solvent at 25° C.
(Raw Material Polyester 2)
A dried ultraviolet absorber (2,2'-(1,4-phenylene)bis(4H-3,1-benzoxazinone-4-one)) (10 parts by mass) and the raw material polyester 1 (IV=0.63) (90 parts by mass) were mixed together, thereby obtaining a raw material polyester 2 including the ultraviolet absorber using a screw extruder.
—Film-Forming Step—
The raw material polyester 1 (90 parts by mass) and the raw material polyester 2 (10 parts by mass) including the ultraviolet absorber were dried so that the moisture content reached 20 ppm, then, were injected into a hopper 1 of a single-screw extruder 1 with a diameter of 50 mm, and were melted at 300° C. in the extruder 1. The raw material polyesters were extruded from a die under the following extrusion conditions through a gear pump and a filter (with a pore diameter of 20 µm).

Regarding the extrusion conditions of the molten resins, the molten resins were extruded from the die with a pressure change set to 1% and a temperature distribution of the molten resin set to 2%. Specifically, the molten resins were heated at a back pressure 1% higher than the average pressure in a barrel of the extruder and at a pipe temperature in the extruder which was a temperature 2% higher than the average temperature in the barrel of the extruder.

The molten resins extruded from the die were extruded onto a cooling casting drum having a temperature set to 25° C. and were adhered to the cooling casting drum using an electrostatic application method. The molten resins were peeled off using a peeling roll disposed opposite to the cooling casting drum, thereby obtaining an un-stretched polyester film 1.
(Production of Easy-Adhesion Layer for PET for Improving Polarizer Adhesiveness)
The following compounds were mixed together using the following formulation, thereby producing a coating fluid P1 for the polarizer-side easy adhesion.
(1) Synthesis of Copolymerized Polyester Resin (A-1)

| | |
|---|---|
| Dimethyl terephthalate | 194.2 parts by mass |
| Dimethyl isophthalate | 184.5 parts by mass |
| Dimethyl-5-sodium sulfoisophthalate | 14.8 parts by mass |
| Diethylene glycol | 233.5 parts by mass |
| Ethylene glycol | 136.6 parts by mass |
| Tetra-n-butyl titanate | 0.2 parts by mass |

The above-described compounds were prepared, and an ester-exchange reaction was caused for four hours in a temperature range of 160° C. to 220° C. Next, the compounds were heated to 255° C., the reaction system was gradually depressurized, and then the compounds were reacted at a reduced pressure of 30 Pa for 1 hour 30 minutes, thereby obtaining a copolymerized polyester resin (A-1).
(2) Production of polyester water dispersion (Aw-1)

| | |
|---|---|
| Copolymerized polyester resin (A-1) | 30 parts by mass |
| Ethylene glycol n-butyl ether | 15 parts by mass |

The above-described compounds were put in, were heated and stirred at 110° C., thereby dissolving the resin. After the resin was fully dissolved, water (55 parts by mass) was gradually added to a polyester solution under stirring. After the addition, the liquid was stirred and cooled to room temperature, thereby producing a milky-white polyester water dispersion (Aw-1) with a solid content of 30% by mass.

(3) Production of Aqueous Solution of Polyvinyl Alcohol (Bw-1)

Water (90 parts by mass) was put in, and a polyvinyl alcohol resin (manufactured by Kuraray Co., Ltd.) (B-1) (10 parts by mass) with a saponification degree of 88% and a polymerization degree of 500 was gradually added to the water under stirring. After the addition, the liquid was stirred and heated to 95° C., thereby dissolving the resin. After the dissolution, the resin was stirred and cooled to room temperature, thereby producing an aqueous solution of polyvinyl alcohol (Bw-1) with a solid content of 10% by mass.

| | |
|---|---|
| Polyisocyanate compound having an isocyanurate structure for which hexamethylene diisocyanate was used as a raw material (manufactured by Asahi Kasei Chemicals Corporation, DURANATE TPA) | 100 parts by mass |
| Propylene glycol monomethyl ether acetate | 55 parts by mass |
| Polyethylene glycol monomethyl ether (average molecular weight of 750) | 30 parts by mass |

The above-described compounds were prepared and were held in a nitrogen atmosphere at 70° C. for four hours. After that, the temperature of a reaction liquid was lowered to 50° C., and methyl ethyl ketoxime (47 parts by mass) was added dropwise. The infrared spectrum of the reaction liquid was measured, the disappearance of the absorption of an isocyanate group was confirmed, and a blocked polyisocyanate water dispersion liquid (C-1) with a solid content of 75% by mass was obtained.

The following coating agents were mixed together, thereby producing a coating fluid P1 for the polarizer-side easy-adhesion having a mass ratio between a polyester-based resin (A) and a polyvinyl alcohol-based resin (B) of 70/30.

| | |
|---|---|
| Water | 40.61% by mass |
| Isopropanol | 30.00% by mass |
| Polyester water dispersion (Aw-1) | 11.67% by mass |
| Aqueous solution of polyvinyl alcohol (Bw-1) | 15.00% by mass |
| Blocked polyisocyanate water dispersion liquid (C-1) | 0.67% by mass |
| Particles (silica sol with an average particle diameter of 100 nm, concentration of solid contents of 40% by mass) | 1.25% by mass |
| Catalyst (organic tin-based compound, concentration of solid contents of 14% by mass) | 0.3% by mass |
| Surfactant (silicon-based, concentration of solid contents of 10% by mass) | 0.5% by mass |

(Application of Easy-Adhesion Layer to One Surface of Polyester Film)

The coating fluid P1 for the polarizer-side easy adhesion was applied onto one side of the un-stretched polyester film 1 using a reverse roll method so that the coating amount after drying was adjusted to reach 0.12 g/m$^2$.

—Horizontal Stretching Step—

(Preheating Section)

The preheating temperature was set to 90° C., and the film was heated to a temperature at which the film could be stretched.

(Stretching Section)

The un-stretched polyester film 1 coated and preheated in the easy-adhesion layer was brought into a tenter (horizontal stretching machine) and was horizontally stretched in the TD direction (the film width direction or the horizontal direction) using the following method and conditions under the following conditions while fixing the end portions of the film with clips, thereby obtaining a film <<Conditions>>

Horizontal stretching temperature: 90° C.
Horizontal stretch ratio: 4.3 times (Thermal Fixing Section)

Next, a thermal fixing treatment was carried out while controlling the film surface temperature of the polyester film to fall within the following range.

<<Conditions>>

Thermal fixing temperature: 180° C.
Thermal fixing time: 15 seconds (Thermal Relaxation Section)

The thermally-fixed polyester film was heated to the following temperature, and the film was relaxed.

Thermal relaxation temperature: 170° C.
Thermal relaxation ratio: 2% in TD direction (film width direction or horizontal direction)

(Cooling Section)

Next, the thermally-relaxed polyester film was cooled at a cooling temperature of 50° C.

The horizontally-stretched polyester film including the easy-adhesion layer for PET on the polarizer side, which was obtained as described above, was used as a film 1.

Manufacturing Example 2

As a film 2, 80 μm-thick TD-stretched PET (with three-layer coextruded ultraviolet absorber added) was manufactured using the following method.

<Manufacture of Film 2>

—Film-Forming Step—

The raw material polyester 1 (90 parts by mass) and the raw material polyester 2 (10 parts by mass) including the ultraviolet absorber were dried so that the moisture content reached 20 ppm or lower, then, were injected into a hopper 1 of a single-screw extruder 1 with a diameter of 50 mm, and were melted at 300° C. in the extruder 1 (interlayer II layer).

In addition, PET 1 was dried so that the moisture content reached 20 ppm or lower, then, was injected into a hopper 2 of a single-screw extruder 2 with a diameter of 30 mm, and was melted at 300° C. in the extruder 2 (outer layer I layer, outer layer III layer).

Two kinds of the polymer molten substance were made to pass through a gear pump and a filter (with a pore diameter of 20 μm) respectively, were laminated in two kinds of three-layer confluent block so that a polymer extruded from the extruder 1 served as the interlayer (II layer) and a polymer extruded from the extruder 2 served as the outer layers (II layer and III layer), and were extruded in a sheet shape from the die.

Regarding the extrusion conditions of the molten resins, the molten resins were extruded from the die with a pressure change set to 1% and a temperature distribution of the molten resin set to 2%. Specifically, the molten resins were heated at a back pressure 1% higher than the average pressure in a barrel of the extruder and at a pipe temperature in the extruder which was a temperature 2% higher than the average temperature in the barrel of the extruder.

The molten resins extruded from the die were extruded onto a cooling casting drum having a temperature set to 25° C. and were adhered to the cooling casting drum using an electrostatic application method. The molten resins were peeled off using a peeling roll disposed opposite to the cooling casting drum, thereby obtaining an un-stretched polyester film 2. At this time, the ejection amounts of the respective extruders were adjusted so that the thickness ratio between the I layer, the II layer, and the III layer reached 10:80:10.

The obtained un-stretched polyester film 2 was provided with the easy-adhesion layer for PET on the polarizer side and was horizontally stretched using the same method as in Manufacturing Example 1, thereby manufacturing a film 2 with a thickness of 80 μm.

Manufacturing Example 3

A film 3 was manufactured using the following method.
(Preparation of Polymer Solution)
1] Cellulose Acylate
Cellulose aceate powder with a degree of substitution of 2.86 was used. Cellulose acylate was dried by being heated at 120° C., the moisture content was adjusted to be 0.5% by mass or lower, and then the cellulose acylate (20 parts by mass) was used.
2] Solvent
The following solvent A was used. The moisture content of each solvent was 0.2% by mass or lower.
  Solvent A dichloromethane/methanol/butanol/water=81.0/17.5/1.0/0.5 (mass ratio)
3] Additives
The following additive A-1 was selected, and additionally, the following additive M was used. The content of the additive A-1 used was 15% by mass when the content of cellulose acylate was set to 100% by mass.
  (Compound Having Repeating Unit)
  A-1: condensate with ethanediol/adipic acid (at a molar ratio of 1:1), number-average molecular weight of 1000, hydroxyl number of 112 mgKOH/g
  (Other Additives)
  M: silicon dioxide fine particles (particle size of 16 nm) (0.02 parts by mass)
4] Dissolution
Swelling and dissolution were carried out using the following dissolution step A.
  Dissolution step A
The above-described solvent and additives were injected into a 400-liter stainless steel dissolution tank with stirring blades, in which cooling water was circulated around the outer circumference, and the cellulose acylate was gradually added thereto while stirring and dispersing the solvent and the additives. After the end of the injection, the components were stirred together at room temperature for two hours, were allowed to swell for three hours, and were stirred again, thereby obtaining a cellulose acylate solution.

The swollen solution was heated to 50° C. in the tank using a jacket-attached pipe, and was further heated to 90° C. by pressurizing the solution to 2 MPa, thereby fully dissolving the components. The heating time was 15 minutes. At this time, as the filter, the housing, and the pipe which were exposed to a high temperature, a filter, a housing, and a pipe which were made of a HASTELLOY alloy and had excellent corrosion resistance were used, and a filter, a housing, and a pipe having a jacket circulating a heat medium for heat retention and heating was used.

Next, the temperature was lowered to 36° C., and a cellulose acylate solution was obtained.

5] Filtration
The obtained cellulose acylate solution was filtered using filter paper with an absolute filtration accuracy of 10 μm (#63, manufactured by Toyo Roshi Kaisha, Ltd.) and was further filtered using a metallic sintered filter with an absolute filtration accuracy of 2.5 μm (FH025, manufactured by Pall Corporation), thereby obtaining a polymer solution.
(Production of Film)
The following film-forming step A-1 was used. The residual solvent amounts of the cellulose acylate films manufactured using the film-forming step were all 0.3% by mass or lower.
  Film-forming step A-1
The polymer solution was heated to 30° C. and was cast on a mirror-like stainless steel supporter, which served as a drum, through a casting geeser. The temperature of the supporter was set to −7° C., and the casting speed was set to 50 m/minute. The space temperature of the entire casting section was set to 10° C. In addition, the rotating cast cellulose acylate film was peeled off from the drum 50 cm ahead of the terminal portion of the casting section, and both ends were clipped with pin tenters. Meanwhile, the residual solvent amount in a web immediately after the peeling, which was computed on the basis of the following expression, was 300% by mass.

$$\text{Residual solvent amount (\% by mass)} = \{(M-N)/N\} \times 100$$

[In the expression, M represents the mass of the cellulose acylate film immediately before being inserted into a casting zone, and N represents the mass of the cellulose acylate film immediately before being inserted into a casting zone when the cellulose acylate film was dried at 110° C. for three hours.]

Subsequently, the cellulose acylate film held with the pin tenters was dried at 100° C. for five minutes and then was removed from the pin tenters, both edges were cut off, and the cellulose acylate film was further dried at 120° C. for 15 minutes while being handled with a roller, thereby producing a 40 μm-thick film 3.

Manufacturing Example 4

A film 4 was manufactured using the following method.
(Preparation of Cellulose Acylate Solution)
1] Cellulose Acylate
The cellulose acylate was used. The cellulose acylate was dried by being heated at 120° C., the moisture content was adjusted to be 0.5% by mass or lower, and then the cellulose acylate (20 parts by mass) was used.
2] Solvent
The above-described solvent A (80 parts by mass) was used.
3] Additives
The following additive A-1 was selected. Here, the "amount added" of the following A-1 represents % by mass when the content of the cellulose acylate was set to 100% by mass. The amount of additives added to the cellulose acylate solution was adjusted to reach 25% by mass.
  (Compound Having Repeating Unit)
  A-1: condensate with ethanediol/adipic acid (at a molar ratio of 1:1), number-average molecular weight of 1000, hydroxyl number of 112 mgKOH/g (Other Additives)

M1: silicon dioxide fine particles (particle size of 16 nm) (0.05 parts by mass)

4] Dissolution

The above-described solvent and additives were injected into a 4000-liter stainless steel dissolution tank with stirring blades, and the cellulose acylate was gradually added thereto while stirring and dispersing the solvent and the additives. After the end of the injection, the components were stirred together at room temperature for two hours, were allowed to swell for three hours, and were stirred again, thereby obtaining a cellulose acylate solution.

Meanwhile, for the stirring, a dissolver-type eccentric stirring axis along which stirring was carried out at a rotation speed of 5 msec (shear stress: $5 \times 10^4$ kgf/m/sec$^2$ [$4.9 \times 10^5$ N/m/sec$^2$]) and a stirring axis along which an anchor blade was provided to the central axis and stirring was carried out at a rotation speed of 1 m/sec (shear stress: $1 \times 10^4$ kgf/m/sec$^2$ [$9.8 \times 10^4$ N/m/sec$^2$]) were used. The swelling was carried out by stopping the high-speed stirring axis and setting the rotation speed of the stirring axis having the anchor blade to 0.5 m/sec.

The swollen solution was heated to 50° C. in the tank using a jacket-attached pipe, and was further heated to 90° C. by pressurizing the solution to 1.2 MPa, thereby fully dissolving the components. The heating time was 15 minutes. At this time, as the filter, the housing, and the pipe which were exposed to a high temperature, a filter, a housing, and a pipe which were made of a HASTELLOY alloy (registered trademark) and had excellent corrosion resistance were used, and a filter, a housing, and a pipe having a jacket circulating a heat medium for heat retention and heating was used.

Next, the temperature was lowered to 36° C., and a cellulose acylate solution was obtained.

A dope before concentration, which was obtained as described above, was flashed in the tank at 80° C. and normal pressure, thereby recovering and separating the evaporated solvent using a concentrator. The concentration of the solid contents in the dope after the flashing reached 24.8% by mass. Meanwhile, the concentrated solvent was returned to a recovery step (recovery was carried out with a distillation step, a dehydration step, and the like) in order to be recycled as a solvent in a preparation step. In a flashing tank, the dope was stirred by rotating an axis having an anchor blade in the central axis at a rotation speed of 0.5 m/sec, thereby removing foam. The temperature of the dope in the tank was 25° C., and the average residence time in the tank was 50 minutes.

5] Filtration

Next, the dope was caused to pass through a sintered fiber metal filter with an initial nominal pore diameter of 10 μm and then, similarly, was caused to pass through a sintered fiber filter with 10 μm. The temperature of the dope after the filtration was adjusted to be 36° C., and the dope was stored in a 2000 L stainless steel stock tank.

(Production of Film)

1] Casting Step

Subsequently, the dope in the stock tank was fed. In order to adjust the temperature of the dope to be 36° C., a jacket was provided to a casting die, and the inlet temperature of a heat-transmitting medium being supplied to the jacket was set to 36° C.

The die, a feed block, and the pipe were maintained at 36° C. during the entire operation step.

2) Casting Die

As a material of the die, two-phase-system stainless steel which had a mixed composition of an austenite phase and a ferrite phase, had a thermal expansion factor of $2 \times 10^{-6}$ (° C.$^{-1}$) or lower, and had corrosion resistance substantially as high as that of SUS316 in a forcible corrosion test in an aqueous solution of an electrolyte was used.

In addition, as the lip tip of the casting die, a lip tip having a WC coating formed through an injection method was used. In addition, a mixed solvent (dichloromethane/methanol/butanol (83/15/2 parts by mass)), which was a solvent capable of dissolving the dope, was supplied at 0.5 ml/minute on one side to a bead end portion and the air-liquid interface of a slit.

3) Metal Supporter

For the dope extruded from the die, a mirror-like stainless steel supporter, which was a drum, was used as a supporter. The surface of the supporter was cast with nickel and was plated with hard chromium. The surface of the drum was polished to a surface roughness of 0.01 μm or smaller, and a supporter including no 50 μm or larger pin balls, one or less 10 μm to 50 μm pin balls, and two or less 10 μm or smaller pin balls in a square meter was used. At this time, the temperature of the drum was set to −5° C., and the rotation speed of the drum was set so that the rotation speed of the drum reached 50 m/minute. Meanwhile, in a case in which the surface of the drum became dirty as the casting proceeded, cleaning was appropriately carried out.

4) Casting Drying

Subsequently, the dope was cast on the drum disposed in a space set to 15° C., and the dope that had been cooled and caused to gelate was peeled off as a gel-form film (web) when the dope was rotated 320 degrees on the drum. At this time, the stretch ratio was set to 25% by adjusting the peeling speed in relation to the supporter speed to be a desired value. The residual solvent amount at the initiation of stretching was 200% by mass.

Here, the residual solvent amount was computed on the basis of the following expression.

Residual solvent amount (% by mass)=$\{(M-N)/N\} \times 100$

[In the expression, M represents the mass of the web (film), and N represents the mass of the web (film) when the web was dried at 110° C. for three hours.]

5) Conditions for Tenter Handling and Drying Step

The peeled web was handled into a drying zone while fixing both ends of the web with tenters having pin clips and was dried using drying air.

6) Conditions for Post-Drying Step

The optical film obtained using the above-described method, the edges of which had been removed, was further dried in a roller handling zone. A material of the roller was aluminum or carbon steel, and the surface of the roller was plated with hard chromium. A roller with a flat surface shape or a roller which had been matted through blasting was used. While the produced optical film was handled with a tension of 190 N, a post thermal treatment was carried out at 130° C. for 10 minutes.

7) Conditions for Post Treatment and Winding

The dried optical film was cooled to 30° C. or lower, and both edges were cut off. The edges were cut off by installing two apparatuses for slitting the edge portion of the film at each of both (right and left) end portions of the film (the number of the slitting apparatuses per side was two) and slitting the end portions of the film. Furthermore, knurling was carried out on both ends of the optical film. Knurls were provided by carrying out embossing from a single side. An optical film was obtained in the above-described manner and was wound using a winder, thereby producing a film 4. The film thickness of the film 4 was 40 μm.

Manufacturing Example 5

A film 5 was manufactured using the following method.

A mixture of a (meth)acrylic resin having a lactone ring structure represented by General Formula (1) illustrated below {mass ratio between copolymerized monomers: methyl methacrylate/methyl 2-(hydroxymethyl)acrylate=8/2, ratio of lactone cyclization: approximately 100%, content proportion of the lactone ring structure: 19.4%, weight-average molecular weight: 133000, the melt flow rate: 6.5 g/10 minutes (240° C., 10 kgf), Tg: 131° C.} (90 parts by mass) and an acrylonitrile-styrene (AS) resin {TOYO AS AS20, manufactured by Toyo Styrene Co., Ltd.} (10 parts by mass); and a pellet with a Tg of 127° C. was supplied to a biaxial extruder and was melt-extruded in a sheet shape at approximately 280° C., thereby obtaining a 160 μm-thick (meth)acrylic resin sheet having a lactone ring structure. This un-stretched sheet was stretched twice in the machine direction (handling direction) and twice in the horizontal direction (direction perpendicular to the handling direction) at a temperature condition of 160° C., thereby obtaining a film 5 (thickness: 40 μm).

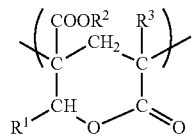

In General Formula (1), $R^1$ is a hydrogen atom, and each of $R^2$ and $R^3$ is independently a methyl group.

Manufacturing Example 6

A film 6 was manufactured using the following method.

A film 6 (thickness: 31 μm) was obtained in the same manner except for the fact that, in the production of the film 5, the stretch ratios were set to 2.8 times in the machine direction (handling direction) and 2.0 times in the horizontal direction (direction perpendicular to the handling direction).

Manufacturing Example 7

A film 7 was manufactured using the following method.

(Preparation of Cellulose Acylate Solution A-1)

The following compositions were injected into a mixing tank and were stirred under heating so that the respective components were dissolved, thereby preparing a cellulose acylate solution A-1.

{Composition of Cellulose Acylate Solution A-1}

| | |
|---|---|
| Cellulose acylate (degree of acetyl substitution: 2.86, average degree of polymerization: 310) | 100 parts by mass |
| Triphenyl phosphate | 5.0 parts by mass |
| Biphenyl diphenyl phosphate | 3.0 parts by mass |
| Ethyl phthalyl ethyl glycolate | 4.0 parts by mass |
| Methylene chloride | 384 parts by mass |
| Methanol | 69 parts by mass |
| Butanol | 9 parts by mass |

(Preparation of Matting Agent Dispersion Liquid B-1]

The following compositions were injected into a disperser and were stirred so that the respective components were dissolved, thereby preparing a matting agent solution (B-1).

{Composition of Matting Agent Dispersion Liquid B-1}

| | |
|---|---|
| Silica particle dispersion liquid (average particle diameter: 16 nm) "AEROSIL R972", manufactured by Nippon Aerosil Co., Ltd. | 10.0 parts by mass |
| Methylene chloride | 72.8 parts by mass |
| Methanol | 3.9 parts by mass |
| Butanol | 0.5 parts by mass |
| Cellulose acylate solution A-1 | 10.3 parts by mass |

(Preparation of Ultraviolet Absorber Solution C-1]

The following composition was injected into another mixing tank and were stirred under heating so that the respective components were dissolved, thereby preparing a ultraviolet absorber solution C-1.

{Composition of Ultraviolet Absorber Solution C-1}

| | |
|---|---|
| Ultraviolet absorber (TINUVIN 326, manufactured by BASF Japan) | 4.0 parts by mass |
| Ultraviolet absorber (TINUVIN 328, manufactured by BASF Japan) | 16.0 parts by mass |
| Methylene chloride | 55.7 parts by mass |
| Methanol | 10 parts by mass |
| Butanol | 1.3 parts by mass |
| Cellulose acylate solution A-1 | 12.9 parts by mass |

The cellulose acylate solution A-1 (94.6 parts by mass) and the matting agent dispersion liquid B-1 (1.3 parts by mass) were sufficiently stirred under heating so that TINUVIN 328 accounted for 0.8 parts by mass, TINUVIN 326 accounted for 0.2 parts by mass, triphenyl phosphate accounted for 5.0 parts by mass, biphenyl diphenyl phosphate accounted for 3.0 parts by mass, and ethyl phthalyl ethyl glycolate accounted for 4.0 parts by mass in relation to 100 parts by mass of cellulose acylate, thereby dissolving the respective components and preparing a dope.

The obtained dope was heated to 30° C. and was cast on a mirror-like stainless steel supporter, which served as a drum, through a casting geeser.

The surface temperature of the supporter was set to −5° C.

The space temperature of all the casting section was set to 15° C.

In addition, the rotating cast cellulose acylate film was peeled off from the drum 50 cm ahead of the terminal portion of the casting section, and both ends were clipped with pin tenters.

The residual solvent amount in the cellulose acylate web immediately after the peeling was 270%, and the film surface temperature of the cellulose acylate web was 5° C.

The cellulose acylate web held by the pin tenters was handled into a drying zone.

In the first drying, drying air (45° C.) was blown.

Next, the cellulose acylate web was dried at 110° C. for five minutes and was further dried at 140° C. for 10 minutes, both ends (5% of the full width respectively) were cut off immediately before the web was wound, then, knurls with a width of 10 mm and a height of 50 μm were provided at both ends, and then the web was wound in a 3000 m-long roll shape.

A 80 μm-thick film 7 was produced as described above.

Manufacturing Example 8

A film 8 was manufactured using the following method.

(Production of Easy-Adhesion Layer for PET for Improving HC Layer Adhesiveness)

The following compounds were mixed together using the following formulation, thereby producing a coating fluid H1 for a hard coat layer-side easy-adhesion layer.

Coating Fluid H1 for Hard Coat Layer-Side Easy-Adhesion Layer

| Polyester resin: (IC) | 60 parts by mass |
|---|---|
| Acrylic resin: (II) | 25 parts by mass |
| Melamine compound: (VIB) | 10 parts by mass |
| Particles: (VII) | 5 parts by mass |

Hereinafter, the details of compounds used will be described.

Polyester resin: (IC)

A sulfonic acid-based water dispersion of a polyester resin copolymerized with a monomer having the following composition The composition of the monomer: (acid component) terephthalic acid/isophthalic acid/5-sodium sulfoisophthalate//(diol component) ethylene glycol/1,4-butanediol/diethylene glycol=56/40/4//70/20/10 (% by mol)

Acrylic resin: (II)

A water dispersion of an acrylic resin polymerized with a monomer having the following composition Emulsified polymer (emulsifier: anionic surfactant) of ethyl acrylate/n-butyl acrylate/methyl methacrylate/N-methylolacrylamide/acrylic acid=65/21/10/2/2 (% by mass)

Urethane resin: (IIIB)

A water dispersion of a urethane resin obtained by neutralizing a prepolymer made up of polycarbonate polyol (400 parts by mass) which was made up of 1,6-hexanediol and diethyl carbonate and had a number-average molecular weight of 2000, neopentyl glycol (10.4 parts by mass), isophorone diisocyanate (58.4 parts by mass), and dimethylol butanoate (74.3 parts by mass) with triethylamine and extending the chain with isophorone diamine Melamine compound: (VIB) hexamethoxymethylmelamine Particles: (VII) silica sol with an average particle diameter of 65 nm (Application of Easy-Adhesion Layer to Both Surfaces of Polyester Film)

The following coating fluid H1 for the hard coat layer-side easy-adhesion layer was applied onto one side of the un-stretched polyester film 1 manufactured in Manufacturing Example 1 and the coating fluid P1 for the polarizer-side easy adhesion manufactured in Manufacturing Example 1 was applied onto the other surface thereof using a reverse roll method while the coating amount after drying was adjusted to reach 0.12 g/m$^2$ on both surfaces.

(Production of HC Layer on PET)

After that, a mixed coating fluid (acryl-1) having the following composition was applied and dried on the surface of a film having the easy-adhesion layers on both surfaces, to which the coating fluid H1 for the hard coat layer-side easy-adhesion layer had been applied, so that the dried film thickness reached 5 μm, and the film was hardened by being irradiated with ultraviolet rays, thereby forming a hard coat layer.

| Dipentaerythritol hexaacrylate | 85 parts by mass |
|---|---|
| 2-Hydroxy-3-phenoxypropyl acrylate | 15 parts by mass |
| Photopolymerization initiator (trade name: IRGACURE 184, manufactured by BASF) | 5 parts by mass |
| Methyl ethyl ketone | 200 parts by mass |

A film having the easy-adhesion layer for PET on the polarizer side of the un-stretched polyester film 1 and having the hard coat layer laminated on the opposite surface through the hard coat layer easy-adhesion layer, which was obtained as described above, was used as a film 8.

[Manufacturing Example 101]

[Production of Polarizing Plate 1]

The film 3 which was the cellulose acylate film manufactured in Manufacturing Example 3 was prepared as the second polarizing plate protective film, was caused to continuously pass through a 1.5 N aqueous solution of sodium hydroxide, and was immersed in the aqueous solution at 55° C. for two minutes. The film was washed in a water-washing bath at room temperature and was neutralized with 0.1 N sulfuric acid at 30° C. Again, the film was washed in the water-washing bath at room temperature and, furthermore, was dried with warm air (100° C.). As described above, the surface of the film 3 which was a cellulose acylate film was caused to gelate.

Subsequently, according to Example 1 in JP2001-141926A, iodine was adsorbed into a polyvinyl alcohol film stretched in the handling direction, thereby producing a 24 μm-thick polarizer. The absorption axis of this polarizer is in a direction parallel to the handling direction.

Using a 3% aqueous solution of polyvinyl alcohol (polarizer 117H manufactured by Kuraray Co., Ltd.) as a water-based adhesive, the film 3 which was the gel-form cellulose acylate film and the belt-like (long) film 1 which was used as the first protective film were attached together in a roll-to-roll manner by means of the polarizer on the surface of the film 1 onto which the coating fluid P1 for the polarizer-side easy adhesion layer had been applied, which corresponded to the polarizer side, in an order of the film 1 provided with the easy-adhesion layer for PET/the PVA polarizer/the film 3, thereby obtaining a polarizing plate 1 including the polarizer that was protected by the films on both surfaces.

Manufacturing Examples 102, 104, 105, 112, and 113

The film 3 and the film 1 were attached together in a roll-to-roll manner using the water-based adhesive in the same manner as in Manufacturing Example 101 except for the fact that the kinds of the first protective film and the second protective film were changed as shown in Table 1 below in Manufacturing Example 101, thereby producing polarizing plates 2, 4, 5, 12, and 13.

Meanwhile, in Table 1 below, "TD60" represents a commercially available cellulose ester film "TD60" (trade name, manufactured by Fujifilm Corporation). In addition, the respective cellulose acylate films were attached to the polarizers after a saponification treatment was carried out using the same method as in Manufacturing Example 101.

Manufacturing Example 103

The film 3 and the film 1 were attached together using the water-based adhesive in the same manner as in Manufacturing Example 101 except for the fact that the MD direction and the TD direction of the film 1 provided with the easy-adhesion layer for PET were switched to each other (so that the slow axis became parallel to the absorption axis of the polarizer), and then the films were manually attached together in batches in Manufacturing Example 102, thereby producing a polarizing plate 3 having a configuration of the film 1 provided with the easy-adhesion layer for PET/PVA/ the film 4.

<Process for Polarizing Plate Through Batch Manual Attachment>

A 1 m×1 m film 3 was prepared as a polarizing plate protective film, was caused to continuously pass through a 1.5 N aqueous solution of sodium hydroxide, and was immersed in the aqueous solution at 55° C. for two minutes. The film was washed in a water-washing bath at room temperature and was neutralized with 0.1 N sulfuric acid at 30° C. Again, the film was washed in the water-washing bath at room temperature and, furthermore, was dried with warm air (100° C.). As described above, the surface of the film 3 was caused to gelate.

Subsequently, according to Example 1 in JP2001-141926A, iodine was adsorbed into a stretched polyvinyl alcohol film, thereby producing a 24 μm-thick polarizer.

The obtained polarizer was cut to dimensions of 1 m×1 m.

Using a 3% aqueous solution of polyvinyl alcohol (polarizer-117H manufactured by Kuraray Co., Ltd.) as an adhesive, the gel-form film 3 and the film 1 provided with the easy-adhesion layer for PET cut to dimensions of 1 m×1 m were attached together by means of the polarizer on the surface of the film 1 onto which the coating fluid for the polarizer-side easy adhesion layer had been applied, which corresponded to the polarizer side. At this time, the film 3 was attached in a manner such that the handling direction of the film 3 and the handling direction of the polarizer were aligned, and the film 1 was attached in a manner such that the stretching direction thereof (the direction orthogonal to the handling direction during the manufacture of the film 1) and the stretching direction of the polarizer were aligned. A polarizing plate 3 including the polarizer that was protected by the films on both surfaces was obtained.

Manufacturing Example 106

Production of Polarizer

According to Example 1 in JP2001-141926A, iodine was adsorbed into a polyvinyl alcohol film stretched in the handling direction, thereby producing a 24 μm-thick polarizer. The absorption axis of this polarizer is in a direction parallel to the handling direction.

(Preparation of UV Adhesive 1)

2-Hydroxyethyl acrylate (100 parts by mass), tolylene diisocyanate (10 parts by mass), and a photopolymerization initiator (IRGACURE 907, manufactured by BASF) (3 parts by mass) were formulated together, thereby preparing an adhesive for the polarizing plate. This adhesive was used as an adhesive 1.

(Production of Polarizing Plate)

The surface of the film 6 obtained in Manufacturing Example 6 was saponified in the same manner as in Manufacturing Example 101.

Next, the adhesive 1 was applied to the respective films using a micro gravure coater (gravure roll: #300, rotation speed: 140%/line) so that the thickness of an adhesion layer 1 between the easy-adhesion layer for the film 1 obtained in Manufacturing Example 1, which was used as the first protective film, and the polarizer reached 3.0 μm, and the thickness of an adhesion layer 2 between the saponified surface of the film 6, which was used as the second protective film, and the polarizer reached 3.0 μm, thereby producing an adhesive-attached protective film Next, the adhesive-attached protective films were attached to both surfaces of the polarizer in a roll-to-roll manner using a rolling machine. The adhesive was hardened by being irradiated with ultraviolet rays from the attached film 6 side, and the respective layers were attached together. The line speed was set to 20 m/min and the integrated light intensity was set to 300 mJ/cm$^2$. As a result, a 500 m-long polarizing plate protected by the first and second protective films on both surfaces was obtained. This polarizing plate was used as a polarizing plate 6.

Manufacturing Examples 107, 110, and 111

The first and second protective films were attached together in a roll-to-roll manner using an UV adhesive in the same manner as in Manufacturing Example 106 except for the fact that the kinds of the first protective film and the second protective film were changed as shown in Table 1 below in Manufacturing Example 106, thereby producing polarizing plates 7, 10, and 11.

Meanwhile, in Table 1, "TD60" represents a commercially available cellulose ester film TD60 (trade name, manufactured by Fujifilm Corporation). In addition, the respective cellulose acylate films were attached to the polarizers after a saponification treatment was carried out using the same method as in Manufacturing Example 101.

The configurations of the polarizing plates 1 to 13 obtained in Manufacturing Examples 101 to 113 are shown in Table 1 below.

TABLE 1

| | First protective film | | | Second protective film | | | |
|---|---|---|---|---|---|---|---|
| | Film name | Presence or absence of polarizer-side easy-adhesion layer | Presence or absence of HC layer | Film name | Presence or absence of polarizer-side easy-adhesion layer | Adhesion type | Adhesive |
| Polarizing plate 1 | Film 1 | Presence (for PET) | Absence | Film 3 | Absence | Roll-to-roll | Water-based |
| Polarizing plate 2 | Film 1 | Presence (for PET) | Absence | Film 4 | Absence | Roll-to-roll | Water-based |
| Polarizing plate 3 | Film 1 | Presence (for PET) | Absence | Film 4 | Absence | Manually | Water-based |
| Polarizing plate 4 | TD60 | Absence | Absence | Film 3 | Absence | Roll-to-roll | Water-based |
| Polarizing plate 5 | TD60 | Absence | Absence | Film 4 | Absence | Roll-to-roll | Water-based |
| Polarizing plate 6 | Film 1 | Presence (for PET) | Absence | Film 6 | Absence | Roll-to-roll | UV |
| Polarizing plate 7 | TD60 | Absence | Absence | Film 6 | Absence | Roll-to-roll | UV |
| Polarizing plate 10 | Film 1 | Presence (for PET) | Absence | Film 5 | Absence | Roll-to-roll | UV |
| Polarizing plate 11 | TD60 | Absence | Absence | Film 5 | Absence | Roll-to-roll | UV |

TABLE 1-continued

|  | First protective film | | | Second protective film | | | |
|---|---|---|---|---|---|---|---|
|  | Film name | Presence or absence of polarizer-side easy-adhesion layer | Presence or absence of HC layer | Film name | Presence or absence of polarizer-side easy-adhesion layer | Adhesion type | Adhesive |
| Polarizing plate 12 | Film 2 | Presence (for PET) | Absence | Film 3 | Absence | Roll-to-roll | Water-based |
| Polarizing plate 13 | Film 8 | Presence (for PET) | Presence | Film 3 | Absence | Roll-to-roll | Water-based |

Examples 1 to 3, 11 to 14, 21, and 31, and Comparative Examples 1, 11, and 31

Production of Liquid Crystal Display Device

Viewer-side polarizing plates of commercially available in-plane switching-type liquid crystal televisions (42LS5600 manufactured by LG Electronics, the thickness of the top and bottom glass substrates for liquid crystal cells were both 0.5 mm) were peeled off, and the polarizing plates 1 to 13 were attached to the televisions with the adhesive layers facing the liquid crystals as shown in Tables 2 to 5. A crossed nicol arrangement was made so that the transmission axis of the front-side (viewer-side) polarization plate was in the vertical direction and the transmission axis of the rear-side (backlight-side) polarizing plate was in the horizontal direction. The thicknesses of the glass substrates used for the liquid crystal cells were 0.5 mm. The obtained liquid crystal display devices were respectively used as liquid crystal display devices of Examples 1 to 3, 11 to 14, 21, and 31, and Comparative Examples 1, 11, and 31.

[Evaluation]
<Water Vapor Permeability of First Protective Film (Outer Film)>

As the water vapor permeability of each of the first protective films, the value of the water vapor permeability after 24 hours elapsed at 40° C. and a relative humidity of 90% was obtained using the method of IS0208.

The obtained water vapor permeability of each of the first protective films was shown in Tables 2 to 5 below.

<Equilibrium Moisture Content of First Protective Film (Outer Film)>

The equilibrium moisture content of each of the first protective films at 25° C. and a relative humidity of 60% was measured from a 7 mm×35 mm film specimen using a moisture measurement instrument and a specimen-drying apparatus "CA-03" and "VA-05" (both manufactured by Mitsubishi Chemical Corporation) according to the Karl Fischer method. The moisture content was computed by dividing the amount (g) of moisture by the mass (g) of the specimen.

The obtained equilibrium moisture content of each of the first protective films was shown in Tables 2 to 5 below.

<Re of First Protective Film (Outer Film)>
(Polyester-Based Film)

The Re of a polyester-based film used in the present specification was measured using the following method.

The alignment-axis directions of the film used as the protective film were obtained using two polarizing plates, and the first polarizing plate was cut to a 4 cm×2 cm rectangular shape so that the alignment-axis directions were orthogonal to each other, thereby producing a measurement sample. For this sample, the refractive indexes (Nx and Ny) of the two orthogonal axes and the refractive index (Nz) in the thickness direction were obtained using an Abbe refractometer NAR-4T (manufactured by Atago Co., Ltd., a measurement wavelength of 589 nm). Furthermore, the thickness $d_1$ (nm) of the first protective film was measured using an electric micrometer (manufactured by Feinpruf GMBH, MILLITRON 1245D) and was converted to a value in nanometer units. The Re was computed from the measured values of Nx, Ny, Nz, and $d_1$.

(Re's of Cellulose-Based Resin Film and Acrylic Film)

The Re's of a cellulose-based resin film and an acrylic film used as the protective films in the present specification were measured using the following method.

After the humidity of a sample film was adjusted at 25° C. and a relative humidity of 60% for 24 hours to be a desired value, the in-plane retardation value (Re) was computed using an automatic birefringence meter (KOBRA-21ADH: manufactured by Oji Scientific Instruments).

The obtained Re's of the first protective films (outer films) were shown in Tables 2 to 5 below.

<Ratio of Modulus of Elasticity of Film>

The modulus of elasticity (GPa) of each film was measured as described below: a specimen with a length in the measurement direction of 200 nm and a width of 10 mm was prepared, was left to stand in an environment of 25° C. and a relative humidity of 60% for 24 hours, and then the modulus of elasticity of the sample with a shape having a width of 10 mm and a length between chucks of 100 mm was measured using a STROGRAPH V10-C manufactured by Toyo Seiki Kogyo Co., Ltd.

The ratio of the modulus of elasticity is computed from the following expression.

Ratio of modulus of elasticity=the modulus of elasticity of the polarizer in the film in the transmission-axis direction/the modulus of elasticity of the polarizer in the film in the absorption-axis direction Meanwhile, in the respective examples and comparative examples, the absorption-axis direction of the polarizer was the MD direction of the polarizer during the production of the polarizing plate, and the transmission-axis direction of the polarizer was the TD direction of the polarizer during the production of the polarizing plate.

The obtained ratio of the modulus of elasticity of each film was shown in Tables 2 to 5 below.

<Rate of Dimensional Change Due to Moisture of Film>

The rate of dimensional change due to moisture [%] of each film can be measured as described below.

A film specimen having a length of 12 cm (in the measurement direction) and a width of 3 cm was prepared, pin holes are opened in the specimen at intervals of 10 cm in an environment of 25° C. and a relative humidity of 60%, the specimen is left to stand in an environment of 25° C. and a relative humidity of 80% for 24 hours, and then the intervals between the pin holes are measured using a pin gauge (the measured value is indicated by LA1).

Next, after the specimen is left to stand in an environment of 25° C. and a relative humidity of 10% for 24 hours, the intervals between the pin holes are measured using a pin gauge (the measured value is indicated by LC0). The rate of dimensional change due to moisture is computed from the following expression using these measured values.

Rate of dimensional change due to moisture [%]={(LA1[cm]−LC0[cm])/10 [cm]}×100

The ratio between rates of dimensional change due to moisture is computed from the following expression.

Ratio between rates of dimensional change due to moisture=the rate of dimensional change due to moisture in the transmission-axis direction of the polarizer in the film/the rate of dimensional change due to moisture in the absorption-axis direction of the polarizer in the film Meanwhile, in the respective examples and comparative examples, the absorption-axis direction of the polarizer was the MD direction of the polarizer during the production of the polarizing plate, and the transmission-axis direction of the polarizer was the TD direction of the polarizer during the production of the polarizing plate.

The obtained ratio between rates of dimensional change due to moisture of each film was shown in Tables 2 to 5 below.

<Method for Computing Contractile Force Ratio of Second Protective Film (Inner Film)>

The film contractile force (N/m) is computed from the rate of dimensional change due to moisture (%) of the film computed from the above-described expression and the modulus of elasticity (GPa) of the film according to the following expressions.

Contractile force of the polarizer in the film in the absorption-axis direction (N/m)=the modulus of elasticity (GPa) of the polarizer in the film in the absorption-axis direction×| the rate of dimensional change due to moisture (%) of the polarizer in the film in the absorption-axis direction|×film thickness (μm)×10

Contractile force of the polarizer in the film in the transmission-axis direction (N/m)=the modulus of elasticity (GPa) of the polarizer in the film in the transmission-axis direction×| the rate of dimensional change due to moisture (%) of the polarizer in the film in the transmission-axis direction|×film thickness (μm)×10

The contractile force ratio is computed from the following expression using the above-described values.

Contractile force ratio=the contractile force of the polarizer in the film in the transmission-axis direction/the contractile force of the polarizer in the film in the absorption-axis direction The obtained contractile force ratio of the second protective film (inner film) was shown in Tables 2 to 5 below.

<Film Thickness of Protective Film>

A section of the manufactured polarizing plate was observed using a scanning electron microscope (SEM), and the film thicknesses of the first and second protective films were measured.

The obtained film thicknesses of the protective films were shown in Tables 2 to 5 below.

<Photoelastic Coefficient of Second Protective Film Used in Rear Polarizer>

A 1 cm×5 cm sample was cut out from the second protective film used in the produced rear polarizer, the retardation value in a film plane was measured using a spectroscopic ellipsometer (M-220, manufactured by JASCO Corporation) while applying stress to the sample at 25° C., and the photoelastic coefficient was computed from the slope of the function between the retardation value and the stress.

The obtained photoelastic coefficients of the second protective films used in the rear polarizers were shown in Tables 2 to 5 below.

[Evaluation]

<Evaluation of Light Leak at Four Corners (Luminance Unevenness at Four Corners) of Liquid Crystal Panel after being Stored in Hot and Humid Environment>

The produced liquid crystal display devices of the examples and the comparative examples were thermally treated at 50° C. and a relative humidity of 60% for 72 hours, and then were left to stand at 25° C. and a relative humidity of 60% with the backlights in the liquid crystal display devices turned on. After five hours, light leaks at the four corners (vertices) of the panels were evaluated and were considered as the evaluations of luminance unevenness at four corners.

The luminance unevenness (light leak) at the four corners was evaluated by capturing an image of the black screen from the front side of the screen using a camera for measuring luminance "ProMetric" (manufactured by Radiant Imaging), and the luminance unevenness was evaluated on the basis of the luminance difference between the average luminance of the entire screen and the luminance at places with significant light leak at the four corners. The obtained results were shown in Tables 2 to 5 below. Practically, the liquid crystal display devices are required to be evaluated as A, B, or C, A and B being preferable evaluations, and A being a more preferable evaluation.

(Evaluation Standards)

A: The luminance unevenness (light leak) at the four corners of the panel is not observed (the luminance unevenness (light leak) of the panel is approximately at the same level as the initial state).

B: Slight luminance unevenness (light leak) is observed at one or two out of the four corners of the panel, but at an acceptable level.

C: Slight luminance unevenness (light leak) is observed at three or four out of the four corners of the panel, but at an acceptable level.

D: Luminance unevenness (light leak) is strong at the four corners of the panel, which is not acceptable.

<Evaluation of Round or Oval Light Leak (Luminance Unevenness) of Liquid Crystal Panel after being Stored in Hot and Humid Environment>

The produced liquid crystal display devices of the examples and the comparative examples were thermally treated at 50° C. and a relative humidity of 60% for 72 hours, and then were left to stand at 25° C. and a relative humidity of 60% with the backlights in the liquid crystal display devices turned on. After 48 hours, oval light leaks appearing on the panels were evaluated and were considered as the evaluations of round or oval luminance unevenness after being stored in a hot and humid environment.

The luminance unevenness was evaluated by capturing an image of the black screen on a slant with respect to the screen using a camera for measuring luminance "ProMetric" (manufactured by Radiant Imaging), and the luminance unevenness was evaluated on the basis of the average luminance of the entire screen and the luminance difference between the inside and outside of the oval shape. The obtained results were shown in Tables 2 to 5. A, B, or C is preferred, A or B is more preferred, and A is particularly preferred.

(Evaluation Standards)

A: Round or oval luminance unevenness is not observed (the light leak of the panel is approximately at the same level as the initial state).

B: Slight light leak is observed at one or two corners out of the round or oval luminance unevenness, but at an acceptable level.

C: Slight light leak is observed at three or four corners out of the round or oval luminance unevenness, but at an acceptable level.

D: Round or oval luminance unevenness is strong.

TABLE 2

|  |  |  | Comparative Example 1 | Example 1 | Example 2 | Example 3 |
|---|---|---|---|---|---|---|
| Front-side polarizing plate | Polarizing plate No. |  | Polarizing plate 8 | Polarizing plate 1 | Polarizing plate 2 | Polarizing plate 3 |
|  | First protective film (first) | Type | Film 1 | Film 1 | Film 1 | Film 1 MD TD switched |
|  |  | Water vapor permeability [g/m$^2$/day] | 20 | 20 | 20 | 20 |
|  |  | Equilibrium moisture content [%] | 0.35 | 0.35 | 0.35 | 0.35 |
|  |  | Re [nm] | 8100 | 8100 | 8100 | 8100 |
|  |  | Ratio of modulus of elasticity | 2.6 | 2.6 | 2.6 | 0.38 |
|  |  | Rate of dimensional change due to moisture [%] | 0.63 | 0.63 | 0.63 | 1.6 |
|  |  | Film thickness [μm] | 80 | 80 | 80 | 80 |
|  | Second protective film (second) | Type | Film 7 | Film 3 | Film 4 | Film 4 |
|  |  | Stretch ratio | 1 | 1 | 1.23 (MD) | 1 |
|  |  | Equilibrium moisture content [%] | 1.81 | 2.03 | 2.03 | 2.03 |
|  |  | Ratio of modulus of elasticity | 0.77 | 0.75 | 0.6 | 0.6 |
|  |  | Ratio between rates of dimensional change due to moisture | 1.6 | 1.8 | 2.7 | 2.7 |
|  |  | Inner film contractile force ratio TD/MD | 1.2 | 1.3 | 1.6 | 1.6 |
|  |  | Film thickness [μm] | 80 | 40 | 40 | 40 |
| Rear polarizer | Polarizing plate No. |  | Polarizing plate 8 | Polarizing plate 1 | Polarizing plate 2 | Polarizing plate 3 |
|  | Second protective film (third) | Type | Film 7 | Film 3 | Film 4 | Film 4 |
|  |  | Stretch ratio | 1 | 1 | 1.23 (MD) | 1 |
|  |  | Equilibrium moisture content [%] | 1.81 | 2.03 | 2.03 | 2.03 |
|  |  | Ratio of modulus of elasticity | 0.77 | 0.75 | 0.6 | 0.6 |
|  |  | Ratio between rates of dimensional change due to moisture | 1.6 | 1.8 | 2.7 | 2.7 |
|  |  | Inner film contractile force ratio TD/MD | 1.2 | 1.3 | 1.6 | 1.6 |
|  |  | Film thickness [μm] | 80 | 40 | 40 | 40 |
|  |  | Photoelastic coefficient [10$^{-12}$/Pa] | 12 | 10.5 | 10.5 | 10.5 |
|  | First protective film (fourth) | Type | Film 1 | Film 1 | Film 1 | Film 1 MD TD switched |
|  |  | Water vapor permeability [g/m$^2$/day] | 20 | 20 | 20 | 20 |
|  |  | Equilibrium moisture content [%] | 0.35 | 0.35 | 0.35 | 0.35 |
|  |  | Re [nm] | 8100 | 8100 | 8100 | 8100 |
|  |  | Ratio of modulus of elasticity | 2.6 | 2.6 | 2.6 | 0.38 |
|  |  | Rate of dimensional change due to moisture [%] | 0.63 | 0.63 | 0.63 | 1.6 |
|  |  | Film thickness [μm] | 80 | 80 | 80 | 80 |
| Evaluation | Luminance unevenness at four corners after being stored in hot and humid environment |  | D | C | B | C |
|  | Round or oval luminance unevenness after being stored in hot and humid environment |  | A | A | A | A |

TABLE 3

|  |  |  | Example 11 | Example 12 | Example 13 | Example 14 |
|---|---|---|---|---|---|---|
| Front-side polarizing plate | Polarizing plate No. |  | Polarizing plate 1 | Polarizing plate 2 | Polarizing plate 13 | Polarizing plate 12 |
|  | First protective film (first) | Type | Film 1 | Film 1 | Film 8 | Film 2 |
|  |  | Water vapor permeability [g/m$^2$/day] | 20 | 20 | 20 | 20 |
|  |  | Equilibrium moisture content [%] | 0.35 | 0.35 | 0.35 | 0.35 |
|  |  | Re [nm] | 8100 | 8100 | 8100 | 8200 |
|  |  | Ratio of modulus of elasticity | 2.6 | 2.6 | 2.6 | 2.7 |
|  |  | Rate of dimensional change due to moisture [%] | 0.63 | 0.63 | 0.63 | 0.63 |
|  |  | Film thickness [μm] | 80 | 80 | 80 | 80 |
|  | Second protective film (second) | Type | Film 3 | Film 4 | Film 3 | Film 3 |
|  |  | Stretch ratio | 1 | 1.23 (MD) | 1 | 1 |
|  |  | Equilibrium moisture content [%] | 2.03 | 2.03 | 2.03 | 2.03 |
|  |  | Ratio of modulus of elasticity | 0.75 | 0.6 | 0.75 | 0.75 |
|  |  | Ratio between rates of dimensional change due to moisture | 1.8 | 2.7 | 1.8 | 1.8 |
|  |  | Inner film contractile force ratio TD/MD | 1.3 | 1.6 | 1.3 | 1.3 |
|  |  | Film thickness [μm] | 40 | 40 | 40 | 40 |

TABLE 3-continued

|  |  |  | Example 11 | Example 12 | Example 13 | Example 14 |
|---|---|---|---|---|---|---|
| Rear polarizer | Polarizing plate No. |  | Polarizing plate 4 | Polarizing plate 5 | Polarizing plate 4 | Polarizing plate 4 |
|  | Second protective film (third) | Type | Film 3 | Film 4 | Film 3 | Film 3 |
|  |  | Stretch ratio | 1 | 1 | 1 | 1 |
|  |  | Equilibrium moisture content [%] | 2.03 | 2.03 | 2.03 | 2.03 |
|  |  | Ratio of modulus of elasticity | 0.75 | 0.75 | 0.75 | 0.75 |
|  |  | Ratio between rates of dimensional change due to moisture | 1.8 | 1.8 | 1.8 | 1.8 |
|  |  | Inner film contractile force ratio TD/MD | 1.3 | 1.3 | 1.3 | 1.3 |
|  |  | Film thickness [μm] | 40 | 40 | 40 | 40 |
|  |  | Photoelastic coefficient [$10^{-12}$/Pa] | 10.5 | 10.5 | 10.5 | 10.5 |
|  | First protective film (fourth) | Type | TD60 | TD60 | TD60 | TD60 |
|  |  | Water vapor permeability [g/m$^2$/day] | 519 | 519 | 519 | 519 |
|  |  | Equilibrium moisture content [%] | 1.91 | 1.91 | 1.91 | 1.91 |
|  |  | Re [nm] | 2 | 2 | 2 | 2 |
|  |  | Ratio of modulus of elasticity | 0.77 | 0.77 | 0.77 | 0.77 |
|  |  | Rate of dimensional change due to moisture [%] | 1.6 | 1.6 | 1.6 | 1.6 |
|  |  | Film thickness [μm] | 60 | 60 | 60 | 60 |
| Evaluation | Luminance unevenness at four corners after being stored in hot and humid environment |  | B | A | B | B |
|  | Round or oval luminance unevenness after being stored in hot and humid environment |  | B | B | B | B |

TABLE 4

|  |  |  | Comparative Example 21 | Example 21 |
|---|---|---|---|---|
| Front-side polarizing plate |  | Polarizing plate No. | Polarizing plate 10 | Polarizing plate 6 |
|  | First protective film (first) | Type | Film 1 | Film 1 |
|  |  | Water vapor permeability [g/m$^2$/day] | 20 | 20 |
|  |  | Equilibrium moisture content [%] | 0.35 | 0.35 |
|  |  | Re [nm] | 8100 | 8100 |
|  |  | Ratio of modulus of elasticity | 2.6 | 2.6 |
|  |  | Rate of dimensional change due to moisture [%] | 0.63 | 0.63 |
|  |  | Film thickness [μm] | 80 | 80 |
|  | Second protective film (second) | Type | Film 5 | Film 6 |
|  |  | Stretch ratio | 1 | 1.4 (MD) |
|  |  | Equilibrium moisture content [%] | 1.14 | 1.14 |
|  |  | Ratio of modulus of elasticity | 1 | 0.95 |
|  |  | Ratio between rates of dimensional change due to moisture | 1.1 | 1.4 |
|  |  | Inner film contractile force ratio TD/MD | 1.1 | 1.4 |
|  |  | Film thickness [μm] | 40 | 31 |
| Rear polarizer |  | Polarizing plate No. | Polarizing plate 10 | Polarizing plate 6 |
|  | Second protective film (third) | Type | Film 5 | Film 6 |
|  |  | Stretch ratio | 1 | 1.4 (MD) |
|  |  | Equilibrium moisture content [%] | 1.14 | 1.14 |
|  |  | Ratio of modulus of elasticity | 1 | 0.95 |
|  |  | Ratio between rates of dimensional change due to moisture | 1.1 | 1.4 |
|  |  | Inner film contractile force ratio TD/MD | 1.1 | 1.4 |
|  |  | Film thickness [μm] | 40 | 31 |
|  |  | Photoelastic coefficient [$10^{-12}$/Pa] | −1 | −1 |

TABLE 4-continued

|  |  |  | Comparative Example 21 | Example 21 |
|---|---|---|---|---|
|  | First protective film (fourth) | Type | Film 1 | Film 1 |
|  |  | Water vapor permeability [g/m$^2$/day] | 20 | 20 |
|  |  | Equilibrium moisture content [%] | 0.35 | 0.35 |
|  |  | Re [nm] | 8100 | 8100 |
|  |  | Ratio of modulus of elasticity | 2.6 | 2.6 |
|  |  | Rate of dimensional change due to moisture [%] | 0.63 | 0.63 |
|  |  | Film thickness [μm] | 80 | 80 |
| Evaluation |  | Luminance unevenness at four corners after being stored in hot and humid environment | D | B |
|  |  | Round or oval luminance unevenness after being stored in hot and humid environment | A | A |

TABLE 5

|  |  |  | Comparative Example 31 | Example 31 |
|---|---|---|---|---|
| Front-side polarizing plate |  | Polarizing plate No. | Polarizing plate 10 | Polarizing plate 6 |
|  | First protective film (first) | Type | Film 1 | Film 1 |
|  |  | Water vapor permeability [g/m$^2$/day] | 20 | 20 |
|  |  | Equilibrium moisture content [%] | 0.35 | 0.35 |
|  |  | Re [nm] | 8100 | 8100 |
|  |  | Ratio of modulus of elasticity | 2.6 | 2.6 |
|  |  | Rate of dimensional change due to moisture [%] | 0.63 | 0.63 |
|  |  | Film thickness [μm] | 80 | 80 |
|  | Second protective film (second) | Type | Film 5 | Film 6 |
|  |  | Stretch ratio | 1 | 1.4 (MD) |
|  |  | Equilibrium moisture content [%] | 1.14 | 1.14 |
|  |  | Ratio of modulus of elasticity | 1 | 0.95 |
|  |  | Ratio between rates of dimensional change due to moisture | 1.1 | 1.4 |
|  |  | Inner film contractile force ratio TD/MD | 1.1 | 1.4 |
|  |  | Film thickness [μm] | 40 | 31 |
| Rear polarizer |  | Polarizing plate No. | Polarizing plate 11 | Polarizing plate 7 |
|  | Second protective film (third) | Type | Film 5 | Film 6 |
|  |  | Stretch ratio | 1 | 1.4 (MD) |
|  |  | Equilibrium moisture content [%] | 1.14 | 1.14 |
|  |  | Ratio of modulus of elasticity | 1 | 0.95 |
|  |  | Ratio between rates of dimensional change due to moisture | 1.1 | 1.4 |
|  |  | Inner film contractile force ratio TD/MD | 1.1 | 1.4 |
|  |  | Film thickness [μm] | 40 | 31 |
|  |  | Photoelastic coefficient [10$^{-12}$/Pa] | −1 | −1 |
|  | First protective film (fourth) | Type | TD60 | TD60 |
|  |  | Water vapor permeability [g/m$^2$/day] | 519 | 519 |
|  |  | Equilibrium moisture content [%] | 1.91 | 1.91 |
|  |  | Re [nm] | 2 | 2 |
|  |  | Ratio of modulus of elasticity | 0.77 | 0.77 |
|  |  | Rate of dimensional change due to moisture [%] | 1.6 | 1.6 |
|  |  | Film thickness [μm] | 60 | 60 |

TABLE 5-continued

|  |  | Comparative Example 31 | Example 31 |
|---|---|---|---|
| Evaluation | Luminance unevenness at four corners after being stored in hot and humid environment | D | B |
|  | Round or oval luminance unevenness after being stored in hot and humid environment | A | A |

From Tables 2 to 5, it was found that, in the liquid crystal display device of the present invention, luminance unevenness at the four corners of the panel was suppressed when the backlight was turned on after the liquid crystal display device was stored in a high temperature and humidity environment, and the warping of the panel in the liquid crystal display device could be suppressed.

On the other hand, it was found from Comparative Examples 1, 21, and 31 that, in the second protective film in the front-side polarizing plate, in a case in which the contractile force ratio of the contractile force in the direction orthogonal to the absorption axis of the polarizer to the contractile force in the absorption axis of the polarizer was below the upper limit value determined by the present invention, luminance unevenness at the four corners could not be suppressed after the liquid crystal display device was stored in a hot and humid environment, and the panel in the liquid crystal display device warped.

Meanwhile, in Tables 2 to 5, the stretch ratios of the second protective films indicate the stretch ratios of the polarizers in the absorption-axis direction (MD direction).

EXPLANATION OF REFERENCES

1: first protective film in front-side polarizing plate
2: second protective film in front-side polarizing plate
3: polarizer in front-side polarizing plate
11: adhesion layer 1
12: adhesion layer 2
14: easy-adhesion layer
15: hard coat layer
21: front-side polarizing plate
22: liquid crystal cell
26: backlight
41: rear polarizer
31: first protective film in rear polarizer
32: second protective film in rear polarizer
33: polarizer in rear polarizer
50: liquid crystal display device

What is claimed is:

1. A liquid crystal display device comprising:
a liquid crystal cell having a liquid crystal layer between two glass substrates;
a front-side polarizing plate provided on a front side of the liquid crystal cell;
a rear polarizer provided on a rear side of the liquid crystal cell; and
a backlight provided on a rear side of the rear polarizer,
wherein the front-side polarizing plate has a first protective film, a polarizer, and a second protective film in this order from a surface side opposite to the liquid crystal cell,
the first protective film in the front-side polarizing plate is a film including a polyester resin or a polycarbonate resin as a main component,
a retardation Re in an in-plane direction of the first protective film in the front-side polarizing plate is 3000 nm or higher,
an equilibrium moisture content of the second protective film in the front-side polarizing plate at 25° C. and a relative humidity of 60% is in a range of 1% to 3%, and
in the second protective film in the front-side polarizing plate, a contractile force in a direction orthogonal to an absorption axis of the polarizer is 1.3 times or higher a contractile force in a direction parallel to the absorption axis of the polarizer.

2. The liquid crystal display device according to claim 1, wherein, in the first protective film in the front-side polarizing plate, a modulus of elasticity in the direction orthogonal to the absorption axis of the polarizer is in a range of 1.5 times to 4 times the modulus of elasticity in the direction parallel to the absorption direction of the polarizer.

3. The liquid crystal display device according to claim 1, wherein the second protective film in the front-side polarizing plate is a film including a (meth)acrylic resin or a cellulose acylate resin.

4. The liquid crystal display device according to claim 1, wherein, in the second protective film in the front-side polarizing plate, the contractile force in the direction orthogonal to the absorption axis of the polarizer is 1.4 times or higher the contractile force in the direction parallel to the absorption axis of the polarizer.

5. The liquid crystal display device according to claim 1, wherein, in the rear polarizer, a photoelastic coefficient of a protective film on a liquid crystal cell side is $11 \times 10^{-12}$/Pa or lower.

6. The liquid crystal display device according to claim 1, wherein the rear polarizer has a first protective film, a polarizer, and a second protective film in this order from the surface side opposite to the liquid crystal cell,
the first protective film in the rear polarizer is a film including a polyester resin or a polycarbonate resin as a main component,
a retardation Re in an in-plane direction of the first protective film in the rear polarizer is 3000 nm or higher,
the second protective film in the rear polarizer is a film including a (meth)acrylic resin or a cellulose acylate rein, and
in the second protective film in the rear polarizer, a contractile force in the direction orthogonal to the absorption axis of the polarizer is 1.3 times or higher a contractile force in the direction parallel to an absorption-axis direction of the polarizer.

7. The liquid crystal display device according to claim 1, wherein thicknesses of the two glass substrates configuring the liquid crystal cell in the liquid crystal display device are respectively 0.5 mm or smaller.

* * * * *